(12) United States Patent
Prigge et al.

(10) Patent No.: US 8,321,832 B2
(45) Date of Patent: Nov. 27, 2012

(54) COMPOSITE APPLICATION MODELING

(75) Inventors: Uta Prigge, Heidelberg (DE); Jens Freund, Heidelberg (DE); Stefan Kaetker, Dossenheim (DE)

(73) Assignee: SAP AG, Walldorf (DE)

( * ) Notice: Subject to any disclaimer, the term of this patent is extended or adjusted under 35 U.S.C. 154(b) by 1024 days.

(21) Appl. No.: 11/397,026

(22) Filed: Mar. 31, 2006

(65) Prior Publication Data

US 2007/0234282 A1 Oct. 4, 2007

(51) Int. Cl.
G06F 9/44 (2006.01)
G06F 9/45 (2006.01)

(52) U.S. Cl. .......................... 717/104; 717/107; 717/109

(58) Field of Classification Search .......... 717/104–110, 717/120–122; 707/203; 709/203–204
See application file for complete search history.

(56) References Cited

U.S. PATENT DOCUMENTS

| | | | |
|---|---|---|---|
| 4,947,321 A | 8/1990 | Spence et al. | |
| 5,361,198 A | 11/1994 | Harmon et al. | |
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warren et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Noble et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A * | 4/1999 | Richley | 717/121 |
| 5,918,219 A | 6/1999 | Isherwood | |
| 5,987,247 A | 11/1999 | Lau | |
| 5,991,536 A * | 11/1999 | Brodsky et al. | 717/104 |

(Continued)

FOREIGN PATENT DOCUMENTS

WO 00/23874 4/2000

(Continued)

OTHER PUBLICATIONS

Bastani et al, "Complex open system design by quasi agents: process oriented modeling in agent based systems", ACM SIGSOFT, vol. 34, No. 4, pp. 1-14, 2009.*

(Continued)

*Primary Examiner* — Anil Khatri

(74) *Attorney, Agent, or Firm* — Fish & Richardson P.C.

(57) ABSTRACT

Methods and apparatus, including computer program products, to realize a software model are described. A user-centric modeling component is defined, the user-centric modeling component modeling an interactive software system and including a plurality of process steps, the plurality of process steps defining a business scenario. For each process step in the plurality of process steps one or more service requirements are identified, where a service requirement represents functionality necessary to accomplish a step. For each service requirement a process component capable of providing the service requirement is identified, the process component modeling software implementing a business process and defining a service operation for providing the service requirement and for interacting with other process components.

20 Claims, 15 Drawing Sheets

U.S. PATENT DOCUMENTS

| | | | |
|---|---|---|---|
| H001830 H | 1/2000 | Petrimoulx et al. | |
| 6,028,997 A * | 2/2000 | Leymann et al. | 717/104 |
| 6,038,393 A * | 3/2000 | Iyengar et al. | 717/104 |
| 6,049,838 A | 4/2000 | Miller et al. | |
| 6,067,559 A | 5/2000 | Allard et al. | |
| 6,070,197 A | 5/2000 | Cobb et al. | |
| 6,112,024 A * | 8/2000 | Almond et al. | 717/122 |
| 6,151,582 A | 11/2000 | Huang et al. | |
| 6,167,563 A * | 12/2000 | Fontana et al. | 717/107 |
| 6,167,564 A * | 12/2000 | Fontana et al. | 717/104 |
| 6,177,932 B1 | 1/2001 | Galdes et al. | |
| 6,182,133 B1 * | 1/2001 | Horvitz | 709/223 |
| 6,192,390 B1 | 2/2001 | Berger et al. | |
| 6,208,345 B1 | 3/2001 | Sheard et al. | |
| 6,237,136 B1 | 5/2001 | Sadahiro | |
| 6,272,672 B1 * | 8/2001 | Conway | 717/107 |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 * | 8/2002 | Bowman-Amuah | 717/108 |
| 6,445,782 B1 | 9/2002 | Elfe et al. | |
| 6,446,045 B1 | 9/2002 | Stone et al. | |
| 6,446,092 B1 * | 9/2002 | Sutter | 707/203 |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 | 10/2003 | Bowman-Amuah | |
| 6,671,673 B1 | 12/2003 | Baseman et al. | |
| 6,678,882 B1 * | 1/2004 | Hurley et al. | 717/121 |
| 6,687,734 B1 * | 2/2004 | Sellink et al. | 709/203 |
| 6,691,151 B1 | 2/2004 | Cheyer et al. | |
| 6,721,783 B1 | 4/2004 | Blossman et al. | |
| 6,738,964 B1 * | 5/2004 | Zink et al. | 717/105 |
| 6,747,679 B1 | 6/2004 | Finch et al. | |
| 6,750,885 B1 | 6/2004 | Finch et al. | |
| 6,757,837 B1 | 6/2004 | Platt et al. | |
| 6,764,009 B2 | 7/2004 | Melick et al. | |
| 6,772,216 B1 | 8/2004 | Ankireddipally et al. | |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,898,783 B1 | 5/2005 | Gupta et al. | |
| 6,904,399 B2 * | 6/2005 | Cooper et al. | 703/22 |
| 6,907,395 B1 * | 6/2005 | Hunt et al. | 703/21 |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 * | 5/2006 | Little et al. | 717/108 |
| 7,050,056 B2 | 5/2006 | Meyringer | |
| 7,050,873 B1 | 5/2006 | Discenzo | |
| 7,055,136 B2 * | 5/2006 | Dzoba et al. | 717/125 |
| 7,058,587 B1 | 6/2006 | Horne | |
| 7,069,536 B2 * | 6/2006 | Yaung | 717/102 |
| 7,072,855 B1 | 7/2006 | Godlewski et al. | |
| 7,076,766 B2 | 7/2006 | Wirts et al. | |
| 7,100,195 B1 | 8/2006 | Underwood | |
| 7,103,873 B2 * | 9/2006 | Tanner et al. | 717/109 |
| 7,117,447 B2 * | 10/2006 | Cobb et al. | 715/762 |
| 7,120,597 B1 | 10/2006 | Knudtzon et al. | |
| 7,120,896 B2 * | 10/2006 | Budhiraja et al. | 717/105 |
| 7,131,069 B1 | 10/2006 | Rush et al. | |
| 7,149,887 B2 | 12/2006 | Morrison et al. | |
| 7,155,403 B2 | 12/2006 | Cirulli et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 * | 3/2007 | Beringer et al. | 717/108 |
| 7,200,569 B2 | 4/2007 | Gallagher et al. | |
| 7,206,768 B1 | 4/2007 | deGroeve et al. | |
| 7,213,232 B1 * | 5/2007 | Knowles | 717/121 |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,293,254 B2 * | 11/2007 | Bloesch et al. | 717/108 |
| 7,299,970 B1 | 11/2007 | Ching | |
| 7,315,830 B1 | 1/2008 | Wirtz et al. | |
| 7,322,024 B2 * | 1/2008 | Carlson et al. | 717/120 |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 * | 4/2008 | Ramsey et al. | 717/104 |
| 7,370,315 B1 * | 5/2008 | Lovell et al. | 717/100 |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 * | 6/2008 | Granny et al. | 717/109 |
| 7,406,716 B2 | 7/2008 | Kanamori et al. | |
| 7,415,697 B1 * | 8/2008 | Houlding | 717/104 |
| 7,418,409 B1 | 8/2008 | Goel | |
| 7,418,424 B2 | 8/2008 | Martin et al. | |
| 7,424,701 B2 * | 9/2008 | Kendall et al. | 717/105 |
| 7,433,979 B2 | 10/2008 | Need | |
| 7,448,022 B1 * | 11/2008 | Ram et al. | 717/120 |
| 7,451,432 B2 * | 11/2008 | Shukla et al. | 717/106 |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 * | 6/2009 | Dillman et al. | 717/102 |
| 7,565,640 B2 * | 7/2009 | Shukla et al. | 717/105 |
| 7,574,694 B2 * | 8/2009 | Mangan et al. | 717/123 |
| 7,624,371 B2 * | 11/2009 | Kulkarni et al. | 717/110 |
| 7,631,291 B2 * | 12/2009 | Shukla et al. | 717/107 |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |
| 7,657,445 B1 | 2/2010 | Goux | |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 * | 3/2010 | Wills et al. | 717/109 |
| 7,693,586 B2 | 4/2010 | Dumas et al. | |
| 7,703,073 B2 * | 4/2010 | Illowsky et al. | 717/121 |
| 7,739,160 B1 | 6/2010 | Ryan et al. | |
| 7,742,985 B1 | 6/2010 | Digrigoli et al. | |
| 7,747,980 B2 * | 6/2010 | Illowsky et al. | 717/107 |
| 7,765,156 B2 | 7/2010 | Staniar et al. | |
| 7,765,521 B2 | 7/2010 | Bryant | |
| 7,788,145 B2 | 8/2010 | Wadawadigi et al. | |
| 7,788,319 B2 * | 8/2010 | Schmidt et al. | 709/203 |
| 7,793,256 B2 * | 9/2010 | Charisius et al. | 717/103 |
| 7,793,258 B2 * | 9/2010 | Sundararajan et al. | 717/109 |
| 7,797,698 B2 | 9/2010 | Diament et al. | |
| 7,814,142 B2 | 10/2010 | Mamou et al. | |
| 7,822,682 B2 | 10/2010 | Arnold et al. | |
| 7,835,971 B2 | 11/2010 | Stockton et al. | |
| 7,886,041 B2 * | 2/2011 | Outhred et al. | 709/224 |
| 7,895,568 B1 * | 2/2011 | Goodwin et al. | 717/108 |
| 7,904,350 B2 | 3/2011 | Ayala et al. | |
| 7,912,755 B2 | 3/2011 | Perry et al. | |
| 7,917,889 B2 * | 3/2011 | Devarakonda et al. | 717/104 |

| | | | |
|---|---|---|---|
| 7,925,985 B2 * | 4/2011 | Moore .................. 715/772 | |
| 8,001,519 B2 | 8/2011 | Conallen et al. | |
| 8,010,938 B2 * | 8/2011 | Elaasar ................. 717/104 | |
| 8,051,332 B2 | 11/2011 | Zakonov et al. | |
| 8,091,065 B2 * | 1/2012 | Mir et al. ............... 717/104 | |
| 8,112,738 B2 * | 2/2012 | Pohl et al. ............. 717/104 | |
| 2001/0052108 A1 | 12/2001 | Bowman-Amuah | |
| 2002/0026394 A1 | 2/2002 | Savage et al. | |
| 2002/0042756 A1 | 4/2002 | Kumar et al. | |
| 2002/0049622 A1 | 4/2002 | Lettich et al. | |
| 2002/0073114 A1 | 6/2002 | Nicastro et al. | |
| 2002/0078046 A1 | 6/2002 | Uluakar et al. | |
| 2002/0082892 A1 | 6/2002 | Raffel et al. | |
| 2002/0103660 A1 | 8/2002 | Cramon et al. | |
| 2002/0104071 A1 | 8/2002 | Charisius et al. | |
| 2002/0107826 A1 | 8/2002 | Ramachandran et al. | |
| 2002/0120553 A1 | 8/2002 | Bowman-Amuah | |
| 2002/0133368 A1 | 9/2002 | Strutt et al. | |
| 2002/0138281 A1 | 9/2002 | Cirulli et al. | |
| 2002/0138358 A1 | 9/2002 | Scheer | |
| 2002/0143598 A1 | 10/2002 | Scheer | |
| 2002/0156695 A1 | 10/2002 | Edwards | |
| 2002/0161907 A1 | 10/2002 | Moon | |
| 2002/0184111 A1 | 12/2002 | Swanson | |
| 2002/0188486 A1 | 12/2002 | Gil et al. | |
| 2002/0198798 A1 | 12/2002 | Ludwig et al. | |
| 2002/0198828 A1 | 12/2002 | Ludwig et al. | |
| 2003/0009754 A1 | 1/2003 | Rowley et al. | |
| 2003/0034578 A1 | 2/2003 | Kim et al. | |
| 2003/0058277 A1 | 3/2003 | Bowman-Amuah | |
| 2003/0069774 A1 | 4/2003 | Hoffman et al. | |
| 2003/0074271 A1 | 4/2003 | Viswanath et al. | |
| 2003/0074360 A1 | 4/2003 | Chen et al. | |
| 2003/0083762 A1 | 5/2003 | Farrah et al. | |
| 2003/0084127 A1 | 5/2003 | Budhiraja et al. | |
| 2003/0130860 A1 | 7/2003 | Datta et al. | |
| 2003/0182206 A1 | 9/2003 | Hendrix et al. | |
| 2003/0212602 A1 | 11/2003 | Schaller | |
| 2003/0233290 A1 | 12/2003 | Yang et al. | |
| 2004/0015367 A1 | 1/2004 | Nicastro et al. | |
| 2004/0054564 A1 | 3/2004 | Fonseca et al. | |
| 2004/0093268 A1 | 5/2004 | Ramchandani et al. | |
| 2004/0093381 A1 | 5/2004 | Hodges et al. | |
| 2004/0111304 A1 | 6/2004 | Meka et al. | |
| 2004/0111639 A1 | 6/2004 | Schwartz et al. | |
| 2004/0128180 A1 | 7/2004 | Abel et al. | |
| 2004/0133481 A1 | 7/2004 | Schwarze et al. | |
| 2004/0153359 A1 | 8/2004 | Ho et al. | |
| 2004/0158506 A1 | 8/2004 | Wille | |
| 2004/0172510 A1 | 9/2004 | Nagashima et al. | |
| 2004/0181470 A1 | 9/2004 | Grounds | |
| 2004/0181538 A1 | 9/2004 | Lo et al. | |
| 2004/0205011 A1 | 10/2004 | Northington et al. | |
| 2004/0236639 A1 | 11/2004 | Candadai et al. | |
| 2004/0236687 A1 | 11/2004 | Tyson-Quah | |
| 2004/0243489 A1 | 12/2004 | Mitchell et al. | |
| 2004/0254866 A1 | 12/2004 | Crumbach et al. | |
| 2004/0255152 A1 | 12/2004 | Kanamori et al. | |
| 2005/0010501 A1 | 1/2005 | Ward, Jr. | |
| 2005/0033588 A1 | 2/2005 | Ruiz et al. | |
| 2005/0044015 A1 | 2/2005 | Bracken et al. | |
| 2005/0060235 A2 | 3/2005 | Byrne | |
| 2005/0060408 A1 | 3/2005 | McIntyre et al. | |
| 2005/0065828 A1 | 3/2005 | Kroswek et al. | |
| 2005/0108680 A1 | 5/2005 | Cheng et al. | |
| 2005/0113092 A1 | 5/2005 | Coppinger et al. | |
| 2005/0114829 A1 | 5/2005 | Robin et al. | |
| 2005/0125310 A1 | 6/2005 | Hazi et al. | |
| 2005/0144125 A1 | 6/2005 | Erbey et al. | |
| 2005/0144226 A1 | 6/2005 | Purewal | |
| 2005/0156500 A1 | 7/2005 | Birecki et al. | |
| 2005/0160104 A1 | 7/2005 | Meera et al. | |
| 2005/0165784 A1 | 7/2005 | Gomez et al. | |
| 2005/0177435 A1 | 8/2005 | Lidow | |
| 2005/0203760 A1 | 9/2005 | Gottumukkala et al. | |
| 2005/0203813 A1 | 9/2005 | Welter et al. | |
| 2005/0209732 A1 | 9/2005 | Audimoolam et al. | |
| 2005/0209943 A1 | 9/2005 | Ballow et al. | |
| 2005/0216325 A1 | 9/2005 | Ziad et al. | |
| 2005/0216507 A1 | 9/2005 | Wright | |
| 2005/0222896 A1 | 10/2005 | Rhyne et al. | |
| 2005/0234787 A1 | 10/2005 | Wallmeier et al. | |
| 2005/0235020 A1 | 10/2005 | Gabelmann et al. | |
| 2005/0240592 A1 | 10/2005 | Mamou et al. | |
| 2005/0246250 A1 | 11/2005 | Murray | |
| 2005/0246482 A1 | 11/2005 | Gabelmann et al. | |
| 2005/0256775 A1 | 11/2005 | Schapler et al. | |
| 2005/0256882 A1 | 11/2005 | Able et al. | |
| 2005/0257125 A1 | 11/2005 | Roesner et al. | |
| 2005/0257197 A1 | 11/2005 | Herter et al. | |
| 2005/0262192 A1 | 11/2005 | Mamou et al. | |
| 2005/0262453 A1 | 11/2005 | Massasso | |
| 2005/0284934 A1 | 12/2005 | Ernesti et al. | |
| 2005/0288987 A1 | 12/2005 | Sattler et al. | |
| 2005/0289020 A1 | 12/2005 | Bruns et al. | |
| 2005/0289079 A1 | 12/2005 | Krishan et al. | |
| 2006/0004802 A1 | 1/2006 | Phillips et al. | |
| 2006/0053063 A1 | 3/2006 | Nagar | |
| 2006/0064344 A1 | 3/2006 | Lidow | |
| 2006/0074704 A1 | 4/2006 | Shukla et al. | |
| 2006/0074731 A1 | 4/2006 | Green et al. | |
| 2006/0080338 A1 | 4/2006 | Seubert et al. | |
| 2006/0085243 A1 | 4/2006 | Cooper et al. | |
| 2006/0085294 A1 | 4/2006 | Boerner et al. | |
| 2006/0085336 A1 | 4/2006 | Seubert et al. | |
| 2006/0089886 A1 | 4/2006 | Wong | |
| 2006/0095439 A1 | 5/2006 | Buchmann et al. | |
| 2006/0129978 A1 | 6/2006 | Abrari et al. | |
| 2006/0143029 A1 | 6/2006 | Akbay et al. | |
| 2006/0149574 A1 | 7/2006 | Bradley et al. | |
| 2006/0206352 A1 | 9/2006 | Pulianda | |
| 2006/0248504 A1 | 11/2006 | Hughes | |
| 2006/0274720 A1 | 12/2006 | Adams et al. | |
| 2006/0287939 A1 | 12/2006 | Harel et al. | |
| 2006/0288350 A1 | 12/2006 | Grigorovitch et al. | |
| 2007/0011650 A1 | 1/2007 | Hage et al. | |
| 2007/0022410 A1 | 1/2007 | Ban et al. | |
| 2007/0050308 A1 | 3/2007 | Latvala et al. | |
| 2007/0075916 A1 | 4/2007 | Bump et al. | |
| 2007/0094098 A1 | 4/2007 | Mayer et al. | |
| 2007/0094261 A1 | 4/2007 | Phelan et al. | |
| 2007/0129964 A1 | 6/2007 | Helmolt et al. | |
| 2007/0129984 A1 | 6/2007 | von Helmolt et al. | |
| 2007/0129985 A1 | 6/2007 | Helmolt et al. | |
| 2007/0143164 A1 | 6/2007 | Kaila et al. | |
| 2007/0150332 A1 | 6/2007 | Grichnik et al. | |
| 2007/0150387 A1 | 6/2007 | Seubert et al. | |
| 2007/0150855 A1 | 6/2007 | Jeong | |
| 2007/0156428 A1 | 7/2007 | Brecht-Tillinger et al. | |
| 2007/0156430 A1 | 7/2007 | Kaetker et al. | |
| 2007/0156474 A1 | 7/2007 | Scherberger et al. | |
| 2007/0156475 A1 | 7/2007 | Berger et al. | |
| 2007/0156476 A1 | 7/2007 | Koegler et al. | |
| 2007/0156482 A1 | 7/2007 | Bagheri | |
| 2007/0156489 A1 | 7/2007 | Berger et al. | |
| 2007/0156493 A1 | 7/2007 | Tebbe et al. | |
| 2007/0156499 A1 | 7/2007 | Berger et al. | |
| 2007/0156500 A1 | 7/2007 | Merkel et al. | |
| 2007/0156538 A1 | 7/2007 | Peter et al. | |
| 2007/0156550 A1 | 7/2007 | Der Emde et al. | |
| 2007/0156731 A1 | 7/2007 | Ben-Zeev | |
| 2007/0162893 A1 | 7/2007 | Moosmann et al. | |
| 2007/0164849 A1 | 7/2007 | Haeberle et al. | |
| 2007/0168303 A1 | 7/2007 | Moosmann et al. | |
| 2007/0174068 A1 | 7/2007 | Alfandary et al. | |
| 2007/0174145 A1 | 7/2007 | Hetzer et al. | |
| 2007/0174811 A1 | 7/2007 | Kaetker et al. | |
| 2007/0186209 A1 | 8/2007 | Kaetker et al. | |
| 2007/0197877 A1 | 8/2007 | Decorte et al. | |
| 2007/0198391 A1 | 8/2007 | Dreyer et al. | |
| 2007/0214065 A1 | 9/2007 | Kahlon et al. | |
| 2007/0220046 A1 | 9/2007 | Moosmann et al. | |
| 2007/0220143 A1 | 9/2007 | Lund et al. | |
| 2007/0233539 A1 | 10/2007 | Suenderhauf et al. | |
| 2007/0233541 A1 | 10/2007 | Schorr et al. | |
| 2007/0233545 A1 | 10/2007 | Cala et al. | |
| 2007/0233574 A1 | 10/2007 | Koegler et al. | |
| 2007/0233575 A1 | 10/2007 | Berger et al. | |

| | | | |
|---|---|---|---|
| 2007/0233581 | A1 | 10/2007 | Peter |
| 2007/0233598 | A1 | 10/2007 | Der Emde et al. |
| 2007/0234282 | A1 | 10/2007 | Prigge et al. |
| 2007/0239508 | A1 | 10/2007 | Fazal et al. |
| 2007/0239569 | A1 | 10/2007 | Lucas et al. |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1 | 1/2008 | Gerhardt |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0215354 | A1 | 9/2008 | Halverson et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al. |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1 | 7/2009 | Abraham et al. |
| 2009/0192858 | A1 | 7/2009 | Johnson |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Uuyang et al, "From business process models to process oriented software systems", ACM Trans. of software engineering and methodology, vol. 19, No. 1, article 2, pp. 1-37, 2009.*
Bastani, "Process oriented abstraction of the complex evolvable systems: problem model construction", ACM SIGSOFT, vo. 33, No. 3, pp. 1-13, 2008.*
Duc et al, "Uniform object modeing methodology and reuse of real time system using UML", ACM EMSOFT, pp. 44-47, 2005.*
Rossi et al, "Desigining and architecturing process aware web applications with EPML", ACM SAC, pp. 2409-2414, 2008.*
Gomaa et al, "Model based software design and adaption", IEEE SEAMS, pp. 1-10, 2007.*
Gerin et al, "Flexible and executable hardware/software interface modeling for multiprocesor SOC design using systemC", IEEE, pp. 390-395, 2007.*
Hahn, "A domain specific modeling language for multiagent systems", ACM AAMAS, pp. 233-240, 2008.*
Sarjoughian et al, "CoSMOs; A visual environment for component based modeling, experimental design and simulation", ACM, pp. 1-9, 2009.*
Hu, "A Co-design modeling approach for computer network systems", IEEE, pp. 685-693, 2007.*
Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.
Arch-int, S. et al.; "Development of Industrial Information Systems on the Web Using Busienss Components"; Computers in Industry; vol. 60; 2003; pp. 231-250.
Astudillo, H.; "How Conceptual System Architecture Leads to Business Process"; ACM; 2000; pp. 35-36.
Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.
Deimel, A.; "The SAP R/3 Business Framework"; Software—Concepts & Tools; vol. 19, No. 1; 1998; pp. 29-36.
Fellner, K.J., et al.; "Classification Framework for Business Components"; System Sciences; Proceedings of the 33rd Annual Hawaii International Conference; Jan. 2000; pp. 3239-3248.
Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.
Gauthier, P. and OSS-J Architecture Board; "OSS through Java (TM) J2EE Design Guidelines"; [online]; Oct. 31, 2001; http://www.ossj.org/downloads/design_guidelines.shtml.
Gessford, J.E.; "Object-Oriented System Design"; Emerging Information Technologies for Competitive Advantage and Economic Development; Proceedings of the 1992 Information Resources Management Association International Conference; 1992; pp. 110-118.
Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.
Kythe, D.K.; "The Promise of Distributed Business Components"; Bell Labs Technical Journal; vol. 75, No. 2; Mar./Apr. 1999; pp. 20-28.
Linthicum, D.S.; "Chapter 9: RPCs, Messaging, and B2B Application Integration"; B2B Application Integration: E-Business Enable Your Enterprise; 2001; pp. 167-181.
Ravichandran, T.; "Special Issue on Component-Based Software Development"; The Data Base for Advances in Information Systems; 2003; pp. 45-46.
Schmid, H.A.; "Business Entity Components and Buisness Process Components"; Joop; vol. 12, No. 6; Oct. 1999; pp. 6-10, 12-15.
Singh, I. et al.; "Designing Enterprise Applications with the J2EE Platform, Second Edition"; Jun. 15, 2002.
Stojanovic, Z. et al.; "Modeling and Design of Service-Oriented Architecture"; Systems, Man and Cybernetics; 2004 IEEE International Conference on the Hague, the Netherlands; Oct. 2004; IEEE, vol. 5; pp. 4147-4152.
Thomas, A.; "Enterprise JavaBeans Server Component Model for Java"; [online]; Dec. 1997; http://www.cs.indiana.edu/classes/b649-gann/ejb-white-paper.pdf.
International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.

International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
He, J. et al., "Component-Based Software Engineering: The Need to Link Methods and Their Theories", Theoretical Aspects of Computer ICTAC 2005. Second International Colloquium. Proceedings (Lecture notes in Computer Science vol. 3722) Springer-Verlag Berlin, Germany, (Oct. 2005), pp. 70-95.
Pilhofer, F., "Writing and Using CORBA Components", 17 pages [online] Apr. 2002 [retrieved on Feb. 28, 2007]. Retrieved from the Internet: <URL: http://www.fpx.de/MicoCCM/download/mico-ccm.pdf>.
Sharifi, M. et al., "CORBA Components Collocation Optimization Enhanced with Local ORB-Like Services Support", On the Move to Meaningful Internet Systems, (2004): COOPIS, ODA and ODBASE. OTM Confederated Conferences COOPIS, DOA and ODBASE 2004. Proceedings Part II (Lecture Notes in Computer Science vol. 3291), Springer-Verlag, Berlin, Germany (2004), pp. 1143-1154.
Cowan, D.D. et al.: "Application Integration: Constructing Composite Applications from Interactive Components", Software Practice & Experience, Wiley & Sons, Bognor Regis, GB, vol. 23, No. 3 (Mar. 1993), pp. 255-275.
Nori A. K. et al.: "Composite Applications: Process Based Application Development", Lecture Notes in Computer Science, Springer Verlag, Berlin, DE, vol. 2444 (Aug. 2003), pp. 48-53.
SAP AG., International Search Report and the Written Opinion mailed Aug. 9, 2007 for the International Application No. PCT/EP/2007/002835 filed Mar. 29, 2007.
SAP AG: "Designing Cross Solutions" SAP XAPPS, [online], Sep. 2003, pp. 1-2 [retrieved on Jul. 7, 2007]. Retrieved from the Internet: <URL: http://www.sap.com/belux/platform/netweaver/pdf/BWP_CAF.pdf>.
Vergil Technology Ltd. "Vergil Composite Application Builder Suite" Product Datasheet, [online] 2003, pp. 1-5 [retrieved on Jul. 23, 2007]. Retrieved from the Internet: <URL: http://www.webservicesmall.com/docs/VCAB_datasheet.pdf>.
Woods, D., "Packaged Composite Applications: A Liberating Force for the User Interface", Internet Citation, [online], Oct. 2003, 4 pages [retrieved on Oct. 17, 2005]. Retrieved from the Internet: <URL: http://www.sapdesignguild.org/editions/edition7/print_composite_applications.asp>.

Anon,; "Sequent Corp Bell Atlantic: Bell Atlantic Selects Sequent for Video-on-Demand Program; Sequent Moves to Seize Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; " Startup Guide—QuickBooks Basic for Windows, QuickBooks Pro for Windows, QuickBooks Premier for Windows"; 2002; 230 pages.
Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312 on Mar. 30, 2010; 23 pages.

Office Action issued in U.S. Appl. No. 11/322,611 on Mar. 31, 2010; 17 pages.

Notice of Allowance issued in U.S. Appl. No. 11/322,610 on Mar. 1, 2010; 12 pages.

Notice of Allowance issued in U.S. Appl. No. 11/322,610 on Jun. 14, 2010; 6 pages.

Office Action issued in U.S. Appl. No. 11/322,398 on Apr. 2, 2010; 39 pages.

Office Action issued in U.S. Appl. No. 11/322,383; May 12, 2010; 23 pages.

Office Action issued in U.S. Appl. No. 11/322,382 on Mar. 29, 2010; 28 pages.

Office Action issued in U.S. Appl. No. 11/323,041 on Mar. 19, 2010; 26 pages.

Advisory Action issued in U.S. Appl. No. 11/323,041 on Jun. 7, 2010; 3 pages.

Notice of Allowance issued in U.S. Appl. No. 11/396,259 on Mar. 29, 2010; 19 pages.

Notice of Allowance issued in U.S. Appl. No. 11/396,288; May 20, 2010; 15 pages.

Notice of Allowance issued in U.S. Appl. No. 11/396,258 on Mar. 31, 2010; 9 pages.

Supplemental Notice of Allowance issued in U.S. Appl. No. 11/396,258 on May 19, 2010; 8 pages.

Office Action issued in U.S. Appl. No. 11/396,236 on Mar. 31, 2010; 20 pages.

Office Action issued in U.S. Appl. No. 11/323,039; Apr. 14, 2010; 15 pages.

Office Action issued in U.S. Appl. No. 11/322,851; May 12, 2010; 15 pages.

Office Action issued in U.S. Appl. No. 11/323,040; Apr. 29, 2010; 17 pages.

Office Action issued in U.S. Appl. No. 11/322,612; Apr. 1, 2010; 23 pages.

Notice of Allowance issued in U.S. Appl. No. 12/233,554 on May 14, 2010; 11 pages.

Notice of Allowance issued in U.S. Appl. No. 11/967,865 on Mar. 31, 2010; 16 pages.

Office Action issued in U.S. Appl. No. 11/323,634; Apr. 2, 2010; 9 pages.

Office Action issued in U.S. Appl. No. 11/322,816; Apr. 15, 2010; 27 pages.

Office Action issued in U.S. Appl. No. 11/396,327 on Apr. 1, 2010; 26 pages.

Office Action issued in U.S. Appl. No. 12/333,085; Mar. 23, 2010; 5 pages.

Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fund Accounting"; School Business Affairs; vol. 49, No. 6; Jun. 1983; pp. 50-52.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,610 on Sep. 23, 2010; 6 pages.

Office Action issued in U.S. Appl. No. 11/322,772; Jul. 12, 2010; 18 pages.

Notice of Allowance issued in U.S. Appl. No. 11/322,398 on Jul. 23, 2010; 38 pages.

Notice of Allowance issued in U.S. Appl. No. 1/322,382 on Sep. 20, 2010; 6 pages.

Notice of Allowance issued in U.S. Appl. No. 11/396,259 on Jul. 6, 2010; 6 pages.

Notice of Allowance issued in U.S. Appl. No. 11/396,259 on Oct. 15, 2010; 6 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Notice of Allowance issued in U.S. Appl. No. 11/396,258 on Jul. 28, 2010; 9 pages.

Office Action issued in U.S. Appl. No. 11/322,845; Jul. 15, 2010; 16 pages.

Advisory Action issued in U.S. Appl. No. 11/322,612; Jun. 24, 2010; 3 pages.

Notice of Allowance issued in U.S. Appl. No. 12/233,554 on Sep. 17, 2010; 10 pages.

Notice of Allowance issued in U.S. Appl. No. 11/968,054 on Sep. 7, 2010; 11 pages.

Office Action issued in U.S. Appl. No. 12/233,557 on Sep. 16, 2010; 16 pages.

Notice of Allowance issued in U.S. Appl. No. 12/233,534 on Jun. 24, 2010; 15 pages.

Notice of Allowance issued in U.S. Appl. No. 12/233,534 on Oct. 20, 2010; 15 pages.

Notice of Allowance issued in U.S. Appl. No. 12/327,354 on Jun. 25, 2010; 16 pages.

Notice of Allowance issued in U.S. Appl. No. 12/327,354 on Oct. 18, 2010; 16 pages.

Notice of Allowance issued in U.S. Appl. No. 11/967,865 on Oct. 6, 2010; 6 pages.

Notice of Allowance issued in U.S. Appl. No. 11/322,482; Jul. 13, 2010; 5 pages.

Office Action issued in U.S. Appl. No. 11/323,590; Jun. 21, 2010; 25 pages.

Office Action issued in U.S. Appl. No. 11/967,483; Aug. 20, 2010; 10 pages.

Notice of Allowance issued in U.S. Appl. No. 12/333,085; Sep. 13, 2010; 8 pages.

Ferscha et al.; "A Light-Weight Component Model for Peer-to-Peer Applications"; IEEE; Mar. 23, 2004.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: Use Guide (SAP NetWeaver Visual Composer release 6.0)"; Document version 1.1; pp. 1-208, 2004.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMWFAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.

Notice of Allowance issued in U.S. Appl. No. 11/322,610 on Dec. 22, 2010; 6 pages.

Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Office Action issued in U.S. Appl. No. 12/233,550 on Jan. 12, 2011; 29 pages.
Notice of Allowance issued in U.S. Appl. No. 12/233,534 on Jan. 31, 2011; 15 pages.
Notice of Allowance issued in U.S. Appl. No. 12/327,354 on Feb. 1, 2011; 16 pages.
Office Action issued in U.S. Appl. No. 11/322,973 on Dec. 7, 2010; 13 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Notice of Allowance issued in U.S. Appl. No. 12/233,462 on Feb. 2, 2011; 11 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Huang et al.; "Supply Chain Configuration Based on Supply Chain Operations Reference (SCOR) Model"; Computers and Industrial Engineering; Elsevier; 2005.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Feb. 22, 2011; 7 pages.
Notice of Allowance issued in U.S. Appl. No. 12/233,550 on May 11, 2011; 20 pages.
Office Action issued in U.S. Appl. No. 11/323,634 on Apr. 29, 2011; 8 pages.
Office Action issued in U.S. Appl. No. 11/967, 483 on Mar. 4, 2011; 6 pages.
Notice of Allowance issued in U.S. Appl. No. 11/322,610 on Mar. 31, 2011; 6 pages.
Notice of Allowance issued in U.S. Appl. No. 11/396,250 on Mar. 2, 2011; 13 pages.
Notice of Allowance issued in U.S. Appl. No. 11/322,845; Apr. 8, 2011; 8 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 11/967,393 on Apr. 15, 2011; 12 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Notice of Allowance issued in U.S. Appl. No. 12/233,554 on Jun. 27, 2011; 7 pages.
Office Action issued in U.S. Appl. No. 12/333,146 on Sep. 6, 2011; 21 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Notice of Allowance issued in U.S. Appl. No. 12/233,462 on Sep. 2, 2011; 7 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Office Action issued in U.S. Appl. No. 11/322,383 on May 12, 2010; 23 pages.
Office Action issued in U.S. Appl. No. 11/322,383 on Nov. 12, 2009; 23 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowanced issued in U.S. Appl. No. 11/322,398 on May 27, 2011; 21 pages.
Notice of Allowance issued in U.S. Appl. No. 11/396,259 on Aug. 5, 2011; 7 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Notice of Allowance issued in U.S. Appl. No. 11/322,851 on Sep. 2, 2011; 8 pages.
Office Action issued in U.S. Appl. No. 11/323,040 on Jul. 26, 2011; 34 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 11/967,489 on Sep. 28, 2011; 7 pages.
Office Action issued in U.S. Appl. No. 12/233,489 on May 13, 2011; 15 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Notice of Allowance issued in U.S. Appl. No. 11/967,890 on Jul. 15, 2011; 10 pages.
Anonymous; "Mastering Management"; Motor Age, vol. 25, No. 10; Oct. 2006; pp. 1-3.
Kremic, Tibor; "Outsourcing Decision Support: A Survey of Benefits, Risks, and Decision Factor"; Supply Chain Management; V. 11; 2006; pp. 467-482.

Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Notice of Allowance in U.S. Appl. No. 12/233,462 on Dec. 12, 2011; 6 pages.
Office Action issued in U.S. Appl. No. 12/233,289 on Oct. 27, 2011; 15 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Office Action issued in U.S. Appl. No. 12/327,701 on Nov. 8, 2011; 20 pages.
Notice of Allowance issued in U.S. Appl. No. 12/233,534 on Dec. 28, 2011; 7 pages.
Notice of Allowanced issued in U.S. Appl. No. 11/322,398 on Oct. 18, 2011; 7 pages.
Examiner's Answer to Appeal Brief issued in U.S. Appl. No. 11/396,236 on Nov. 10, 2011; 19 pages.
Office Action issued in U.S. Appl. No. 11/396,288 on Oct. 17, 2011; 38 pages.
Notice of Allowance issued in U.S. Appl. No. 11/396,250 on Dec. 7, 2011; 6 pages.
Office Action issued in U.S. Appl. No. 11/396,252 on Nov. 10, 2011; 18 pages.
Notice of Allowance issued in U.S. Appl. No. 11/322,845; Nov. 13, 2011; 9 pages.
Notice of Allowance issued in U.S. Appl. No. 12/233,520 on Nov. 10, 2011; 22 pages.
Office Action issued in U.S. Appl. No. 12/233,458 on Oct. 12, 2011; 19 pages.
Notice of Allowance issued in U.S. Appl. No. 11/967,393 on Nov. 9, 2011; 9 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance in U.S. Appl. No. 12/233,462 on Apr. 5, 2012; 7 pages.
Notice of Allowance issued in U.S. Appl. No. 12/233,289 on Feb. 15, 2012; 11 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 11/396,259 on Mar. 15, 2012; 7 pages.
Notice of Allowance issued in U.S. Appl. No. 11/396,258 on Feb. 3, 2012; 12 pages.
Notice of Allowance issued in U.S. Appl. No. 11/322,851 on Mar. 1, 2012; 9 pages.
Office Action issued in U.S. Appl. No. 11/967,489 on Feb. 6, 2012; 9 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

* cited by examiner

COMPOSITE APPLICATION MODELING

BACKGROUND

The subject matter of this patent application relates to modeling software systems, and more particularly to modeling the composition and interaction of components in a software system including user interfaces.

Enterprises are typically modifying and adapting enterprise software systems with increasing frequency. But enterprise software systems are generally large and complex. Such systems can require many different components, distributed across many different hardware platforms, possibly in several different geographical locations. Typical software systems may not be able to reduce this complexity for end users. In order to change the design, configuration and implement new parts of an enterprise software system, one is required to understand details of the system at varying levels, depending on his or her role in designing, managing or implementing the system.

For example, some individuals may grasp how a given business scenario works from a business person's perspective, but do not necessarily understand how to model a software architecture formally to realize the business scenario. Whereas others may have knowledge of a software model but no know how to adapt the model to a business scenario. Given a business scenario that needs to be realized, composite application modeling helps users to understand and adapt existing software systems. This includes modeling components with and without a user interface. It may be that only the user interface needs to be adjusted, not the underlying software components.

SUMMARY

In general, in one aspect, embodiments of the invention feature defining a user-centric modeling component, the user-centric modeling component modeling an interactive software system and including a plurality of process steps, the plurality of process steps defining a business scenario. For each process step in the plurality of process steps identifying one or more service requirements, where a service requirement represents functionality necessary to accomplish a step. For each service requirement, identifying a process component capable of providing the service requirement, the process component modeling software implementing a business process and defining a service operation for providing the service requirement and for interacting with other process components.

These and other embodiments can optionally include one or more of the following features. The plurality of process steps are defined by a composite pattern. The one or more service requirements are defined by a service pattern. The plurality of services are defined by a service pattern. Defining a new process component to provide a service requirement. An existing process component can be modified to provide a service requirement. A detailed process step model can be defined, the detailed process step model including one or more decision points. A detailed process step model can be defined, the detailed process step model including one or more user interface screens, one or more user roles, and one or more departments. A detailed process step model can be defined, the detailed process step model including one or tasks to be accomplished by a department or user role. One or more process component interaction models can be generated with a plurality of identified process components. A process component models software implementing a distinct business process. The user-centric modeling component is part of a composite integration scenario; and the composite integration scenario comprises a plurality of logically associated process components to realize a business scenario. Each process component belongs to exactly one deployment unit; and a deployment unit characterizes independently operable software deployable on a separate computer hardware platform. A detailed process step model is defined, the detailed process step model including one or more of: a decision point, an event, a workflow, an assigned department or a role.

In general, in another aspect, embodiments of the invention feature defining a user-centric modeling component including a plurality of process steps, the plurality of process steps defining a business scenario. For each process step in the plurality of process steps identifying one or more service requirements for each step. For each service requirement identifying a process component capable of providing the service requirement, the process component defining a service interface for providing the service requirement and for interacting with other process components. And defining a detailed process step model, the detailed process step model including one or more decision points.

In general, in another aspect, embodiments of the invention feature displaying, in a first view, a composite catalog illustrating composite integration scenarios, each of the composite integration scenarios characterizing software implementing a respective and distinct business scenario. Displaying, in a second view, a composite integration scenario illustrating a user-centric component and one or more process components, where a process component characterizes software implementing a respective and distinct business process. And displaying, in a third view, a process step model corresponding to the user-centric component, the process step model illustrating one or more process steps in a business scenario.

These and other embodiments can optionally include one or more of the following features. A user-initiated selection of a first graphical user interface associated with a single composite integration scenario in the first view is received, and wherein the second view is displayed in response to the selection of the first graphical user interface element. A user-initiated selection of a second graphical user interface associated with the user-centric component in the second view is received, and wherein the third view is displayed in response to the selection of the second graphical user interface element. Displaying, in a fourth view, a process component model illustrating one or more process interfaces and a business object. Receiving a user-initiated selection of a third graphical user interface associated with a process component in the second view, and wherein the fourth view is displayed in response to the selection of the third graphical user interface element.

In general, in another aspect, embodiments of the invention feature a user interface; and a model design component coupled to the user interface and configured to perform operations comprising displaying, in a first view, a composite integration scenario catalog illustrating one or more composite integration scenarios, each of the composite integration scenarios characterizing software implementing a respective and distinct business scenario. Displaying, in a second view, a composite integration scenario illustrating a user-centric component and one or more process components, where a process component characterizes software implementing a respective and distinct business process. And displaying, in a third view, a process step model corresponding to the user-centric component, the process step model illustrating one or more process steps in a business scenario.

Particular embodiments of the invention can be implemented to realize one or more of the following advantages. A model provides modeling entities to represent aspects of a software system. Multiple views of the model are provided in a user interface. The model views offer varying levels of detail, allowing users to focus on the information that is important for their task. Model entities can be reused and correspond to reusable software that implements functionality corresponding to the model entity. The model supports dynamic mapping between incompatible message formats. A model can incorporate external components. The models can be used to generate metadata, which can be stored in a repository and used in various downstream processes and tools.

Models can be used at specification and design time, reused for testing, reused for consulting purposes and reused again for documentation (for the developing company, independent software vendors, and customers). Since different parts of a software system can be used within composites, there can be different organizational departments that realize a composite. The models improve collaboration between these departments by providing people with different backgrounds a common language for interaction.

Moreover, the specification discloses a logical abstraction of how various software modules can interact to realize a business scenario. In particular, effective use can be made of process components as units of software reuse, to provide a design that can be implemented reliably in a cost effective way. Deployment units, each of which is deployable on a separate computer hardware platform independent of every other deployment unit, are capable of enabling a scalable design. Furthermore, service interfaces of the process components can define a pair-wise interaction between pairs of process components that are in different deployment units in a scalable manner.

The modeling methodology allows users to quickly adapt software systems. The models can be used to improve communication between different user groups within a software company. Composite patterns can be used to support and simplify modeling of common composite integration scenarios. If business functionality is missing, a new process component with new business object(s) can be modeled.

Some processes are automated and do not need a user interface. Others need user interfaces, for example if a user has to enter data. Combining the end user experience with the application integration leads to the topic of composite applications. Composite applications have a user interface. A composite application can define business activities covering one or many backend components in a user-centric way and provides independence from underlying application systems. A composite application can guide one or many users through a set of process steps.

Models for composite modeling are used at specification and design time, reused for testing, reused for consulting purposes and reused again for documentation (for the developing company, ISVs and customers). Since different parts of a software system are used within composites, there can be different departments that realize a composite. The models improve collaboration between these departments. Composite application modeling gives people with different backgrounds a common language to exchange information.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
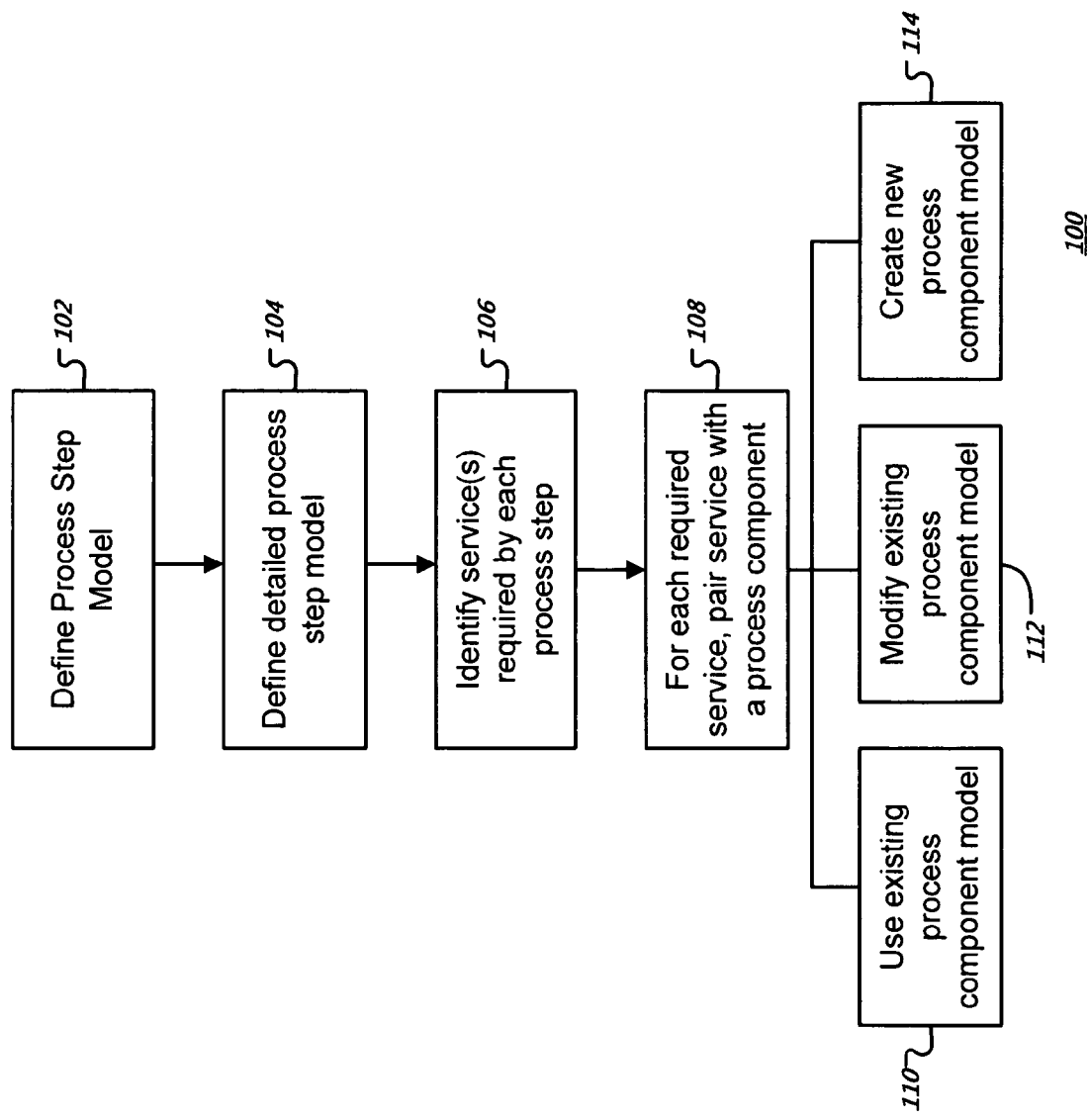
FIG. 1 is a process flow diagram illustrating an approach for composite application modeling.

FIG. 1 is a flow diagram illustrating a technique 100 for composite application modeling. A process step model for a composite application component is defined from a business's point-of-view (step 102). This is done by a user such as a Business Analyst, for example. A process step model models an interactive software system that is built from existing and, optionally, newly created components and includes a user interface. A process step model includes one or more process steps, which are logical steps in a business scenario. For example, two illustrated process steps are "Accept Customer Order" and "Fulfill Customer Order".

A detailed process step model is defined (step 104). The detailed process step model is based on the process step model and augments process steps with branching logic and events. In addition, the detailed process step model can provide information about user interface involvement (e.g., which user interface screens are used) and department and user roles that accomplish a given process step.

One or more service requirements by one or more process steps in the process step model are identified (step 106). A service requirement represents functionality that is needed to accomplish a process step. A model that shows the process steps and service requirements is termed a consumer model. Decision logic and other information is omitted so that the user creating the model can concentrate on process steps and service requirements.

As will be discussed below, a business scenario encompasses process component models and interactions between them, which are required for realization of the business scenario. A process component model characterizes software implementing a respective and distinct business process. Each service requirement is paired with a process component model that is capable of fulfilling the service requirement (step 108). This can include using an existing process component model (step 110) or modifying an existing process component model (step 112). Alternatively, a new process component model can be created to provide the service requirement (step 114).

When a composite application does not require the ability to persist information in a new business object, the composite application is termed ultra-light. In contrast, when a composite application requires the ability to persist information in a business object, the composite application is termed heavy. The process components paired with the service requirements are modeled in a provider model. A software implementation can be created from the defined models by generating service definitions, implementing the services, and developing the user interface.

Figure 2:
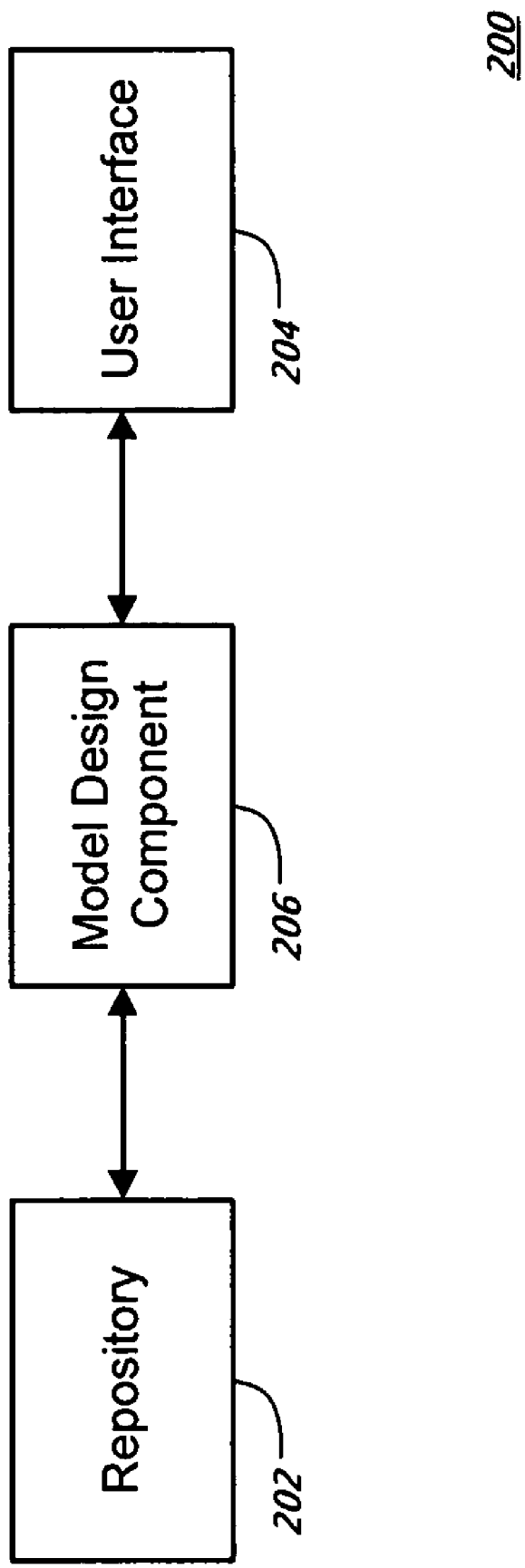
FIG. 2 is an illustration of a composite application modeling system.

FIG. 2 is an illustration of a composite application modeling system. An interactive graphical user interface (GUI) 204 allows users to interact with the modeling system to create, inspect and modify models. The GUI 204 can present a model in different views offering differing levels of detail. This allows users to focus on information that is appropriate to their role or the task at hand. The GUI allows users to drill-down to GUI mockups and actual GUIs for a composite application. A model design component 206 coupled to the GUI 204 provides one or more tools for modifying and manipulating one or more models. A repository 202 is capable of storing one or more models and associated information. By way of illustration, the repository can incorporate one or more files, databases, services, combinations of these, or other suitable means for providing persistent storage of model information.

Figure 3:
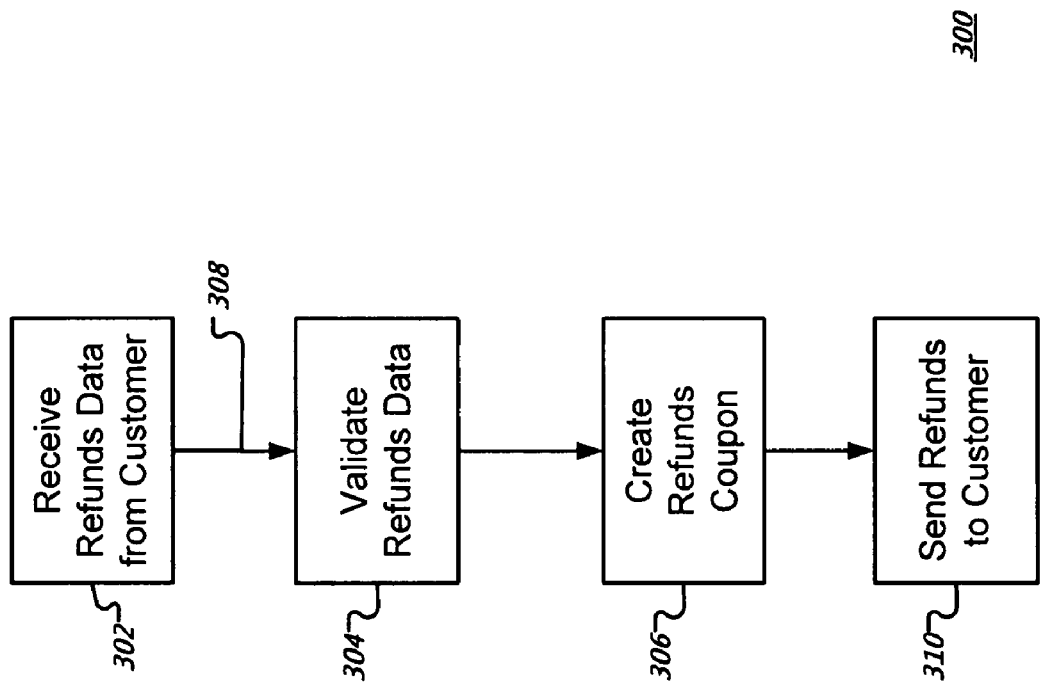
FIG. 3 is an illustration of a process step model for a composite application.

FIG. 3 is an illustration of a process step model 300 for a composite application. Process steps, for example, can be defined by business analysts that understand how a given business scenario works from a business person's perspective down to processes and process steps, but do not necessarily understand how to model a software architecture formally to realize the business scenario. For example, a customer might have purchased a camera at a vendor. If the customer has a problem with the camera, the customer sends a given template with customer data and the camera data to the vendor. The data is validated and in case of correctness the accepted refunds coupon can be sent to the customer. In this illustration, a first process step 302 in a business scenario receives refunds data from a customer. A second process step 304 in the business scenario is for validating the refunds data. A third process step 306 creates a refunds coupon. Finally, a fourth process step 310 sends refunds to a customer. Process steps can be defined at varying levels of granularity and although this figure illustrates four process steps, fewer or more process steps are possible. Process steps are generally performed in order beginning with the uppermost process step (e.g., 302) and following sequence arrows (e.g., 308). If a detailed process step model has been developed (see below), the decision logic therein can be omitted so that all possible process steps are listed in linear order.

Figure 4:
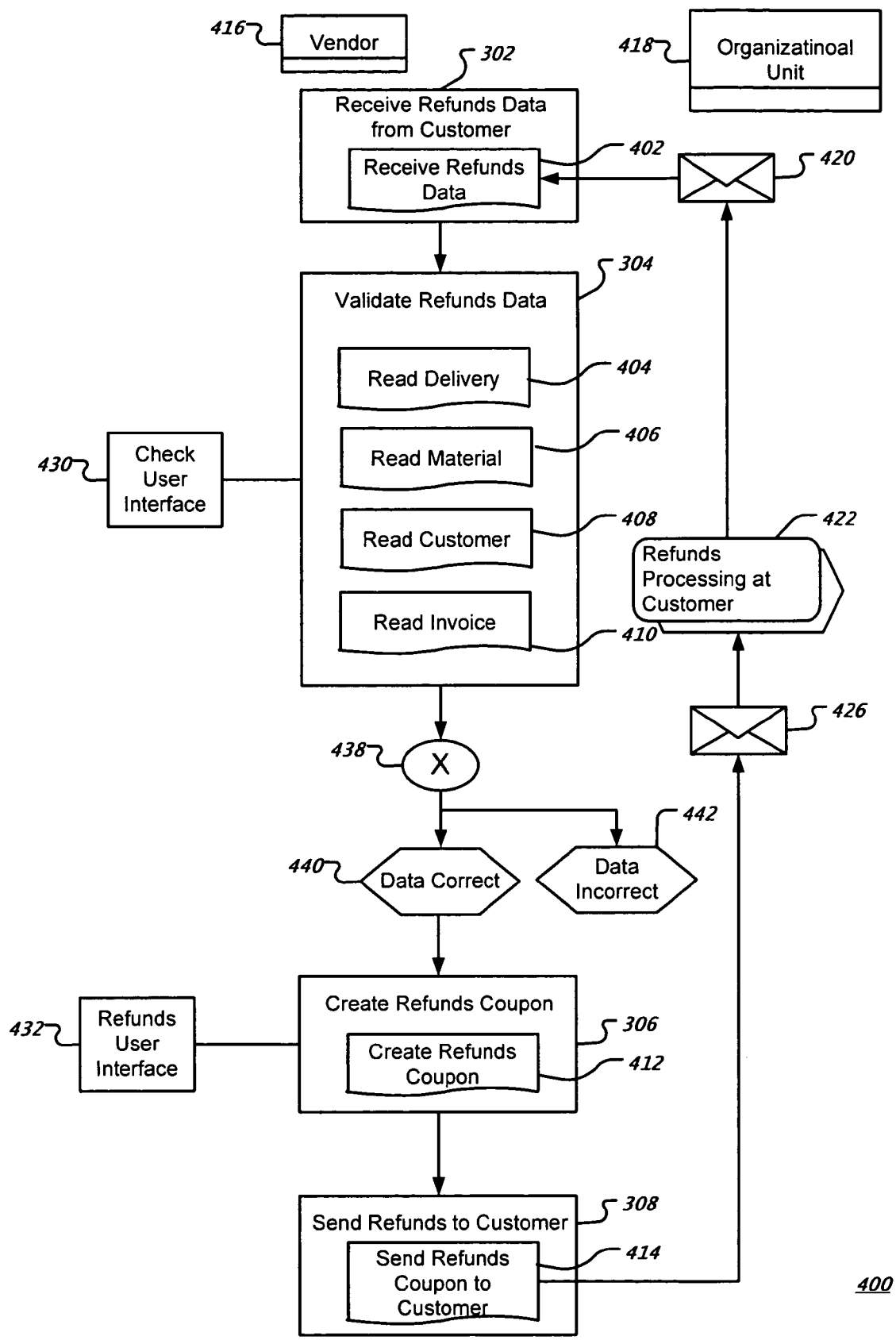
FIG. 4 is a detailed process step model which adds decision logic, user interface screens, tasks, user roles and exposes communication in a process step model.

FIG. 4 shows a detailed process step model 400 which adds decision logic, user interface screens, tasks, user roles and exposes communication in a process step model. Service requirements have been identified for process steps. A service requirement represents functionality needed to accomplish a given process step. By way of illustration, service requirements can be identified by software architects or developers. A service requirement is modeled as an invocation of a process component service operation. Process component service operations are described below.

In this illustration, the process step 302 for receiving refunds data from a customer has a receive refunds data service requirement 402. The process step 304 for validating refunds data has four service requirements: read delivery 404, read material 406, read customer 408, and read invoice 410. The process step 306 for creating a refunds coupon has a create refunds coupon service requirement 412. The process step 308 for sending refunds to a customer includes a sends refunds coupon service requirement 414.

The receive refunds data from Receive Refunds Data from customer process step 302 receives an electronic mail message 420 from a Refunds Processing at Customer process component 422 containing a refund request for a purchased product via the receive refunds data service requirement 402. Process step 304 is performed after which a decision point 438 is reached. A decision point represents conditional flow control logic (e.g., if-then, if-then-else, and combinations of these). If the refund data is correct, a data correct event 440 is generated and received by process step 306. Otherwise, a data incorrect event 442 is generated.

Process step 308 is performed after process step 306, assuming the data correct event 440 was generated. As part of the send refunds coupon to service requirement 414 in process step 308, an electronic mail message 426 is provided to the product data processing process component 422 to relay a refunds form.

Roles can be associated with process steps and organizations. For example, a vender organizational unit 416 is associated with process step 302 and an organizational unit role 418 is associated with the product data processing process step 422. User interface building blocks can be added to the model 400 to represent points of user interaction. A user interface building block can be a screen or part of a screen, for example, and can be reused in other models. A check user interface user interface block 430 is associated with the validate refunds data process step 304 and a refunds user interface block 432 is associated with process step 306.

In addition to what is described above, a detailed process step model can include operation requirements, interfaces, services, packages (which are logical groupings of process steps), forks, joins, iterations (e.g., which are typically done when something has been rejected instead of approved), forms, workflows shown by role assignments, involved departments (even different companies that are involved in a process). Other model entities are also possible.

Figure 5:
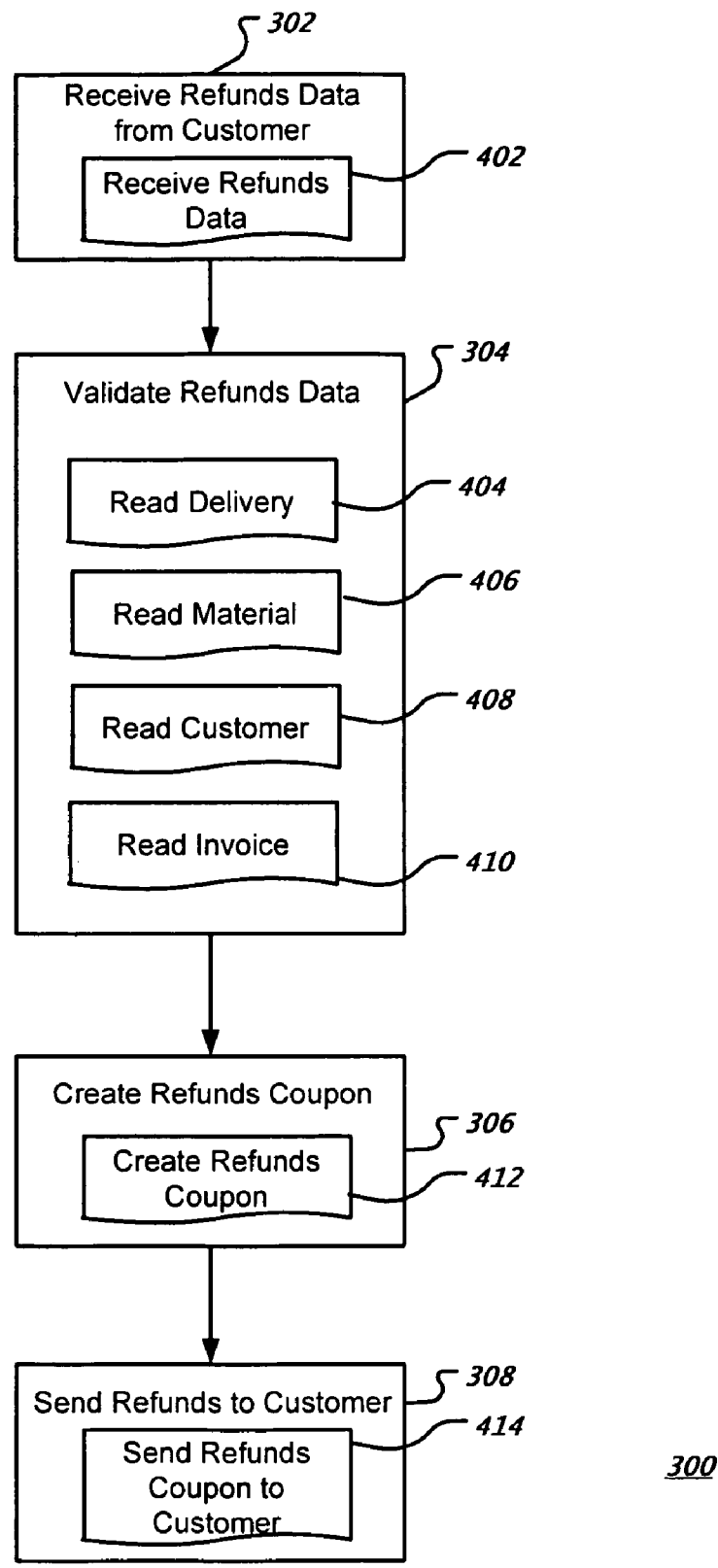
FIG. 5 is an illustration of a process step model, including service requirements for process steps that represent functionality needed to accomplish the process steps.

FIG. 5 is an illustration of a process step model 300, including service requirements for process steps (described in FIG. 4) that represent functionality needed to accomplish the process steps. Since the process step model models services that can be consumed, this model is termed a "consumer model". The process step model can be derived from the model in FIG. 4 by omitting information that is not needed for allocation of the needed service operations and process components.

Figure 6:
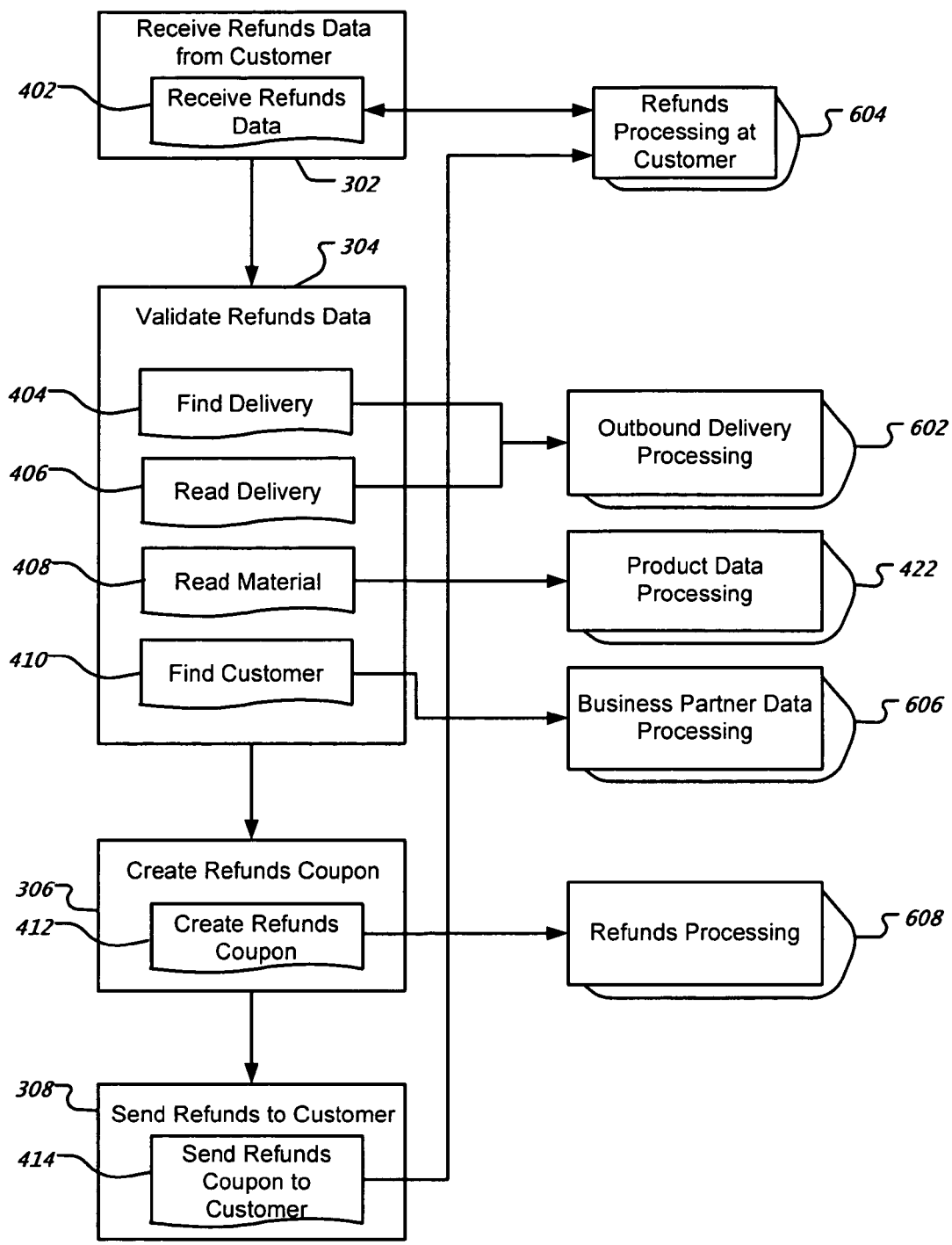
FIG. 6 is an illustration of a process step model, paired with process components that can furnish needed service operations corresponding to the service requirements.

FIG. 6 is an illustration of a process step model 300, including service requirements paired with process components that have service operations corresponding to the service requirements. An architect who knows the existing process components can create this model, for example. Service requirements 402 and 414 are paired with process component Refunds Processing at Customer 604. Service requirements 404 and 406 are paired with process component Outbound Delivery 602. Service requirement 408 is paired with process component 422. Service requirement 410 is paired with process component 606. Finally, service requirement 412 is paired with process component 608. External process components, such as process component 604, can be shown to place the modeled process components in their operational context relative to another system, e.g., a system belonging to another company, such as a customer or other third party.

Figure 7:
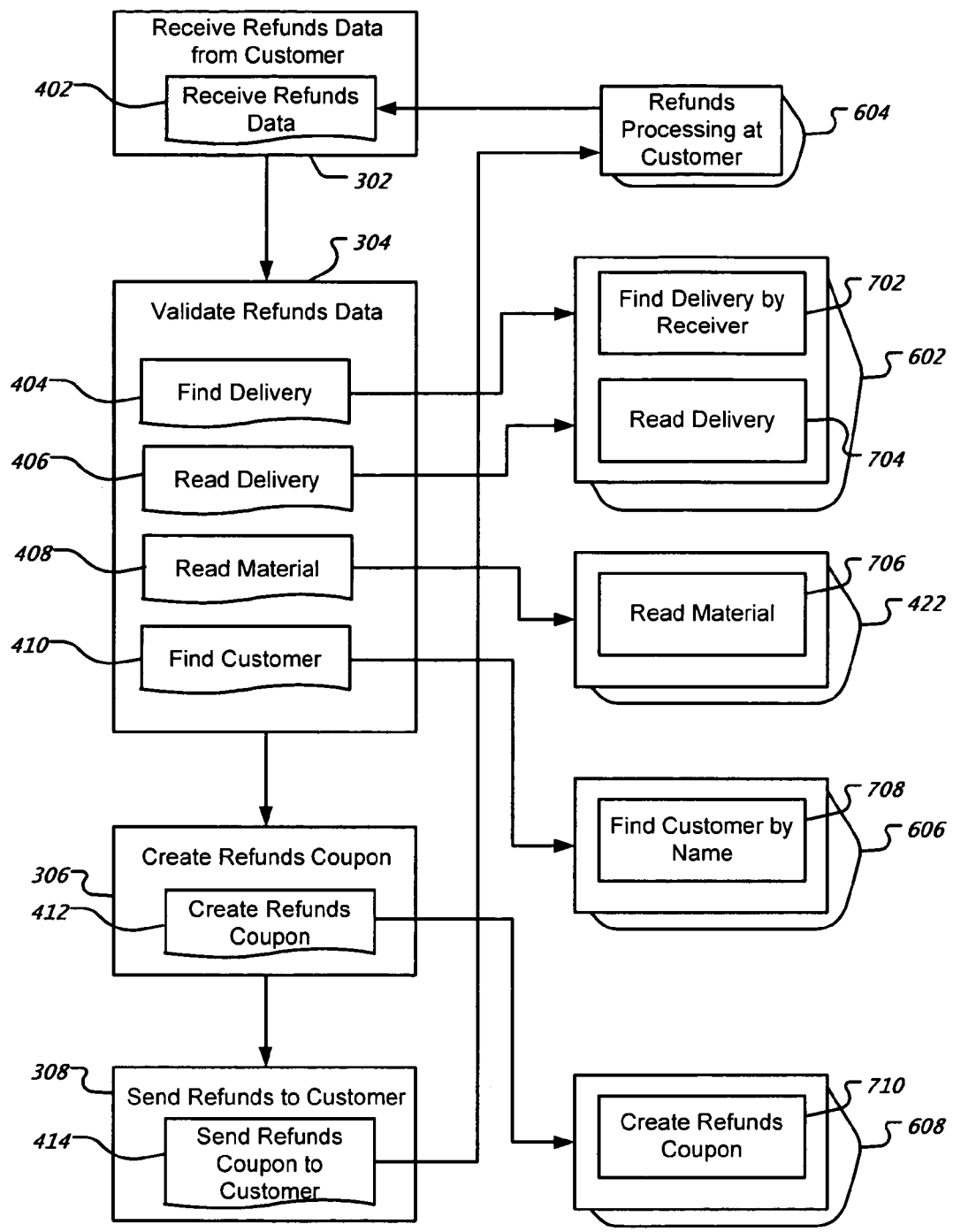
FIG. 7 is an illustration of a refined consumer model based on the process step model from FIG. 6 and illustrating service operations and their interfaces.

FIG. 7 is an illustration of a refined consumer model 700 based on the process step model 300 from FIG. 6. A refined consumer model exposes interfaces and service operations in the process components that are paired with service requirements. A service operation represents functionality, such as the creation of a customer quote or releasing a customer quote. For example, service operation 702 is paired with service requirement 404, service operation 704 is paired with service requirement 406, service operation 706 is paired with service requirement 408, service operation 708 is paired with service requirement 410, and service operation 710 is paired with service operation 412.

In addition, a process component defines one or more respective service interfaces for interacting with other process components. A service interface (or "interface") is a named grouping of one or more service operations. An interface specifies offered (inbound service interface) or used (outbound service interface) functionality. A user-centric component calls synchronous services, so this model utilizes with inbound service interfaces.

A service operation belongs to exactly one process component. A process component generally has multiple service operations. A service operation is the smallest, separately-callable functionality of a process component. An operation modeled by a set of data types used as input, output, and fault parameters serves as a signature. A service operation can use multiple message types for inbound, outbound, or error messages.

Process components can be assigned to multiple deployment units so that each process component is included in exactly one deployment unit. Each deployment unit characterizes independently operable software that can be separately deployed on different hardware platforms. Each process component is entirely included in exactly one deployment unit. Context independent interactions among a plurality of process components are defined so that all communication and interaction between a process component in one deployment unit and any process component in any other deployment unit takes place through the respective process service interfaces (i.e., through operation) of the process components.

Separate deployment units can be deployed on separate physical computing systems and include one or more process components. For example, a physical system can be a cluster of computers having direct access to a common database. The process components of one deployment unit interact with those of another deployment unit only using messages passed through one or more data communication networks or other suitable communication channels. Thus, a deployment unit software entity deployed on a platform belonging to Company A can interact with a deployment unit software entity deployed on a separate platform belonging to Company B, allowing for business-to-business communication. Or deployment units in different divisions of the same company can interact with each other. More than one instance of a given deployment unit software entity can execute at the same time.

Figure 8:
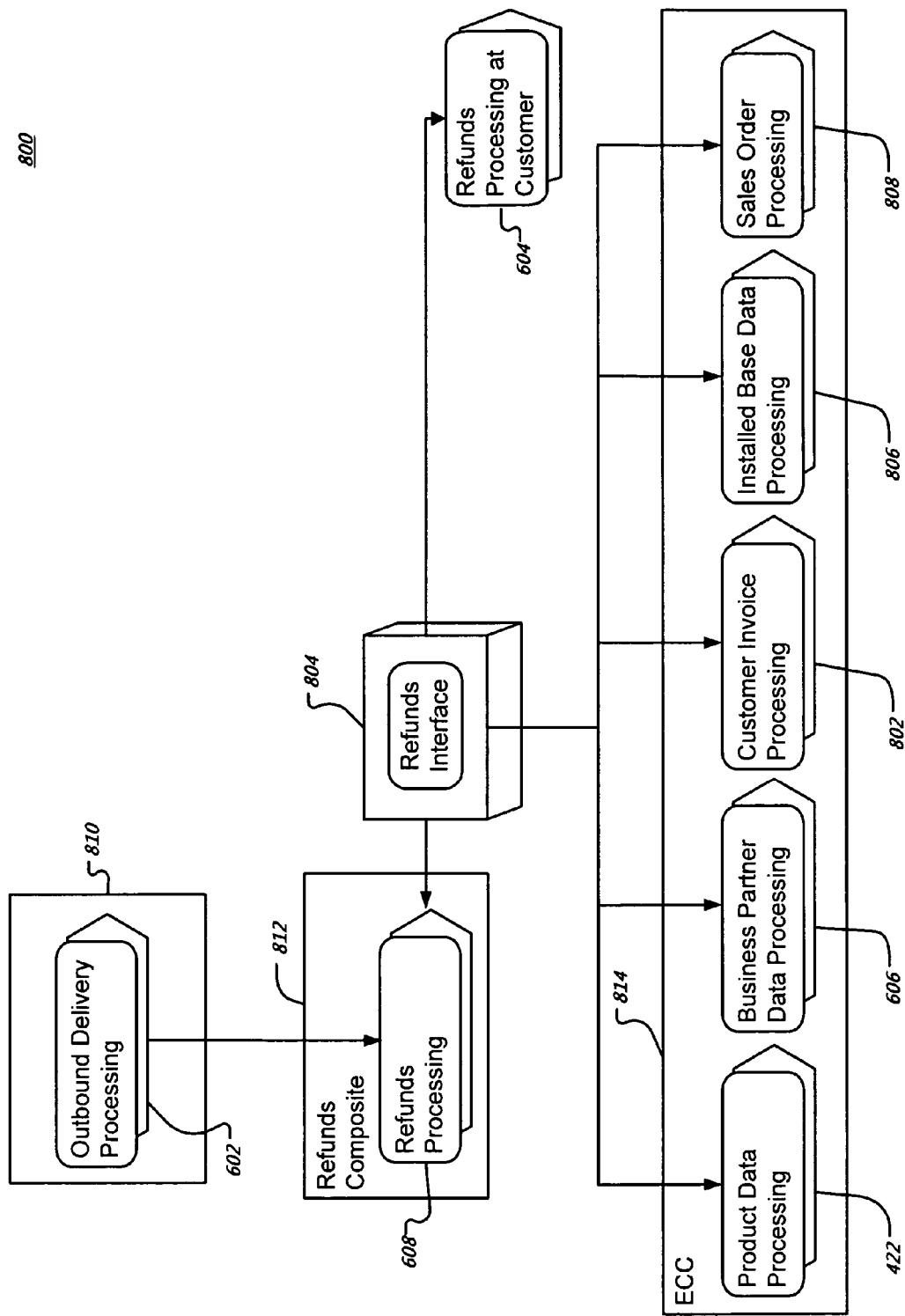
FIG. 8 is an illustration of a composite integration scenario.

FIG. 8 shows an illustration of a composite integration scenario model 800. When process components have been associated with process steps and service requirements, this model can be created by a business analyst, architect or developer. A composite integration scenario model (or "scenario") includes a user-centric component and one or more process components that have been previously associated and the interactions between them. In addition, in the models described above, an architect determined if the needed business logic exists or if new business logic has to be provided. The new business logic will be incorporated in one or more new process components residing in a new deployment unit 812 (e.g., because a composite application can be shipped independently). In a composite integration scenario model, the new process components can be illustrated in the same color as the user-centric component, showing the most important new entities of a composite application.

A user-centric process component is only represented once in an integration scenario model, even though the actual flow in the software system might invoke the same component multiple times. A scenario describes at a high level the potential direct or indirect (i.e., through one or more other components) interaction between components in one or more deployment units that are relevant to realize the business scenario. For example, a user-centric component 804 represents a user interface and consumes services of the existing process components 604, 422, 606, 802, 806, 808 and the new composite process component 608. The new process component 608 gets data from one or more services of process component 602. Components of customer systems can be incorporated here such as 604 (e.g., a process component outside company). Different interactions can be distinguished such as service interactions, direct interactions (with proprietary technology), email and other interactions, for example. Internal details of components are not described, nor are details of process component interactions (e.g., service interfaces, service operations and messages). This is done in other models which can be accessed via drilldown in user interface 204.

The scenario 800 includes three deployment units: 810, 812 and 814. The deployment unit 810 includes the outbound delivery processing process component 602. The process component 602 in deployment unit 810 provides one or more services for the refunds processing process component 608. The refunds processing process component 608 was newly created to provide services required by a process step model of the user-centric component 804. Newly created process components that provide services to a user-centric component are included in their own deployment unit. In addition to utilizing one or more services provided by the process component 608, the user-centric component 804 uses the services of process components 422, 606, 802, 806, 808, in deployment unit 814, and external process component 604.

Figure 9:
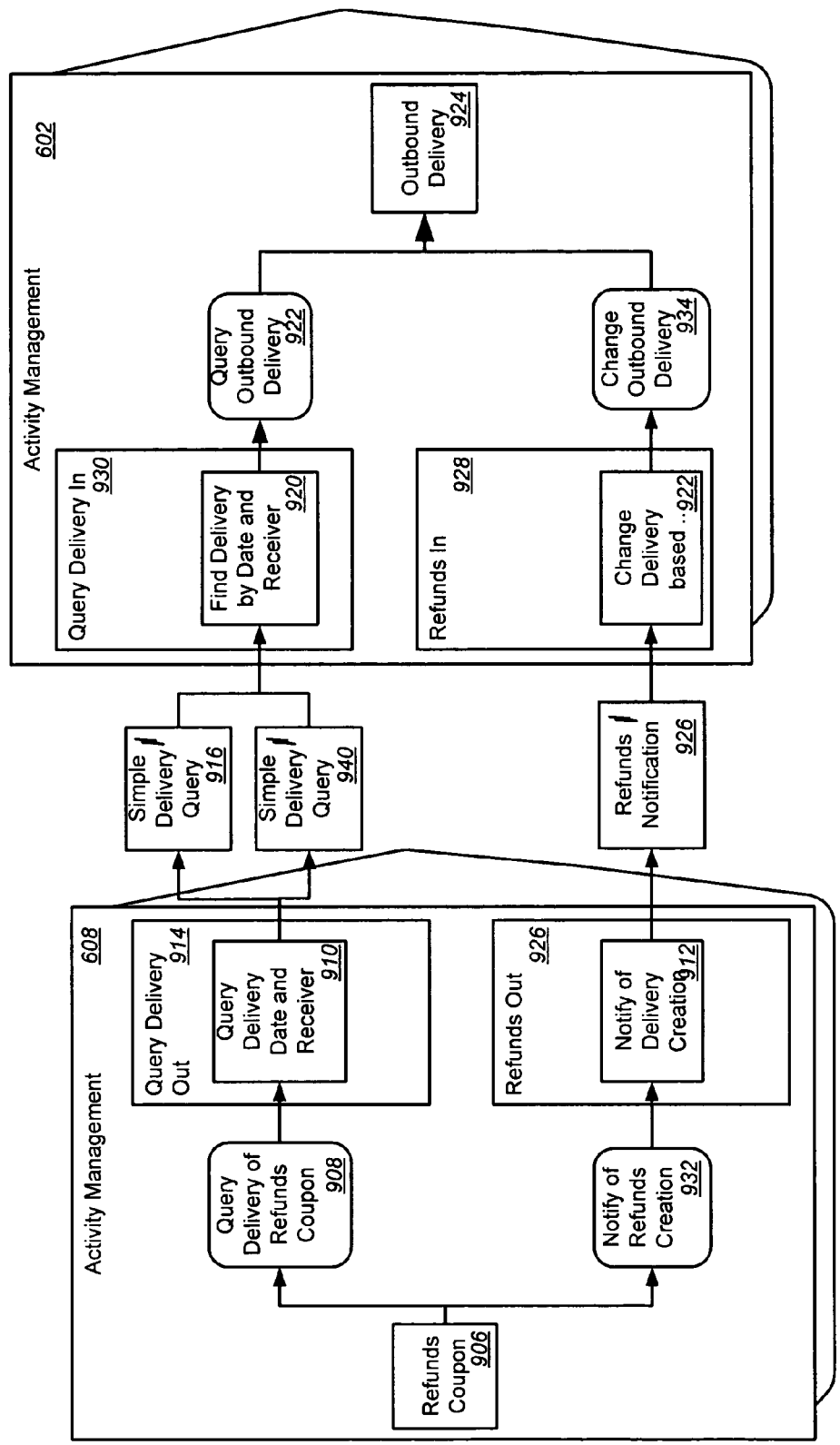
FIG. 9 is an illustration of a process component interaction model.

FIG. 9 is an illustration of a process component interaction model (PCIM) 900. PCIMs can be reused in different scenarios. A PCIM is a view of a model that incorporates relevant model entities associated with potential interaction between two process components (e.g., 602, 608). Service interfaces, process agents and business objects that are not relevant to the potential interaction are excluded. The PCIM 900 shows interactions between a Refunds Processing process component 608 and an Outbound Delivery Processing process component 602.

Service operations are described for purposes of exposition in terms of process agents. A process agent (or "agent") is an optional modeling entity representing software that implements a service operation. Service operations can be implemented through other conventional techniques. Service operations (and hence agents) can be synchronous or asynchronous, and inbound or outbound.

Synchronous outbound service operations send synchronous request messages and process response messages. Synchronous inbound service operations respond to messages from synchronous outbound service operations. Synchronous communication is when a message is sent with the expectation that a response will be received promptly. Asynchronous communication comes with the expectation that a response will be provided by a separate service operation invoked at a later point in time.

An asynchronous outbound service operation is specific to a sending business object. If the asynchronous outbound service operation is triggering a new communication to another process component, it is specific for the triggered process component. However, the same asynchronous outbound process service operation can be used for two service operations which are part of the same message choreography.

Inbound service operations are called after a message has been received by a process component. Based on the process component's business object's status, inbound service operations may initiate communication across deployment units, may initiate business-to-business (B2B) communication, or both by sending messages using well-defined services.

The Refunds Processing process component 608 includes an Refunds Coupon business object 906 which can use a Query Delivery of Refunds Coupon outbound process agent 908 to invoke a Query Delivery Date and Receiver service operation 910 included in a Query Delivery Out service interface 914 which causes a Simple Delivery Query message 916 to be sent to the Outbound Delivery Processing process component 602. The Refunds Coupon business object 906 can use a Notify of Refunds Creation outbound process agent 932 to invoke a Notify of Delivery Creation service operation 912 included in service interface 926 which causes a Refunds Notification message 926 to be sent to the Outbound Delivery Processing process component 602.

The Outbound Delivery Processing process component 602 receives the Simple Delivery Query message 916 by way of a Find Delivery by Date and Receiver service operation 920 included in service interface 930 which provides the message 916 to the synchronous Query Outbound Delivery service agent 922. The agent 922 assembles the queried data from the business object outbound delivery 924 and provides the data to the message Simple Delivery Query Response 940. The service operation 910 receives the data and provides the information to the agent 908.

The service agent 922 changes the Outbound Delivery Object 924 based on the message 926. The Outbound Delivery Processing process component 602 receives the Refunds Notification message 926 by way of a Change Delivery Based on Refunds Processing service operation 922 included in service interface 928 which provides the message 926 to the Change Outbound Delivery service agent 934. The service agent 934 creates or modifies the Outbound Delivery Object 924 based on the message 926.

The message format of a message sent by an outbound service operation need not match the message format expected by an inbound service operation. If the message formats do not match, and the message is transformed, or mapped. Message mapping is indicated by interposition of an intermediary mapping model element between the source and the destination of the message in a PCM or a PCIM.

Figure 10A:
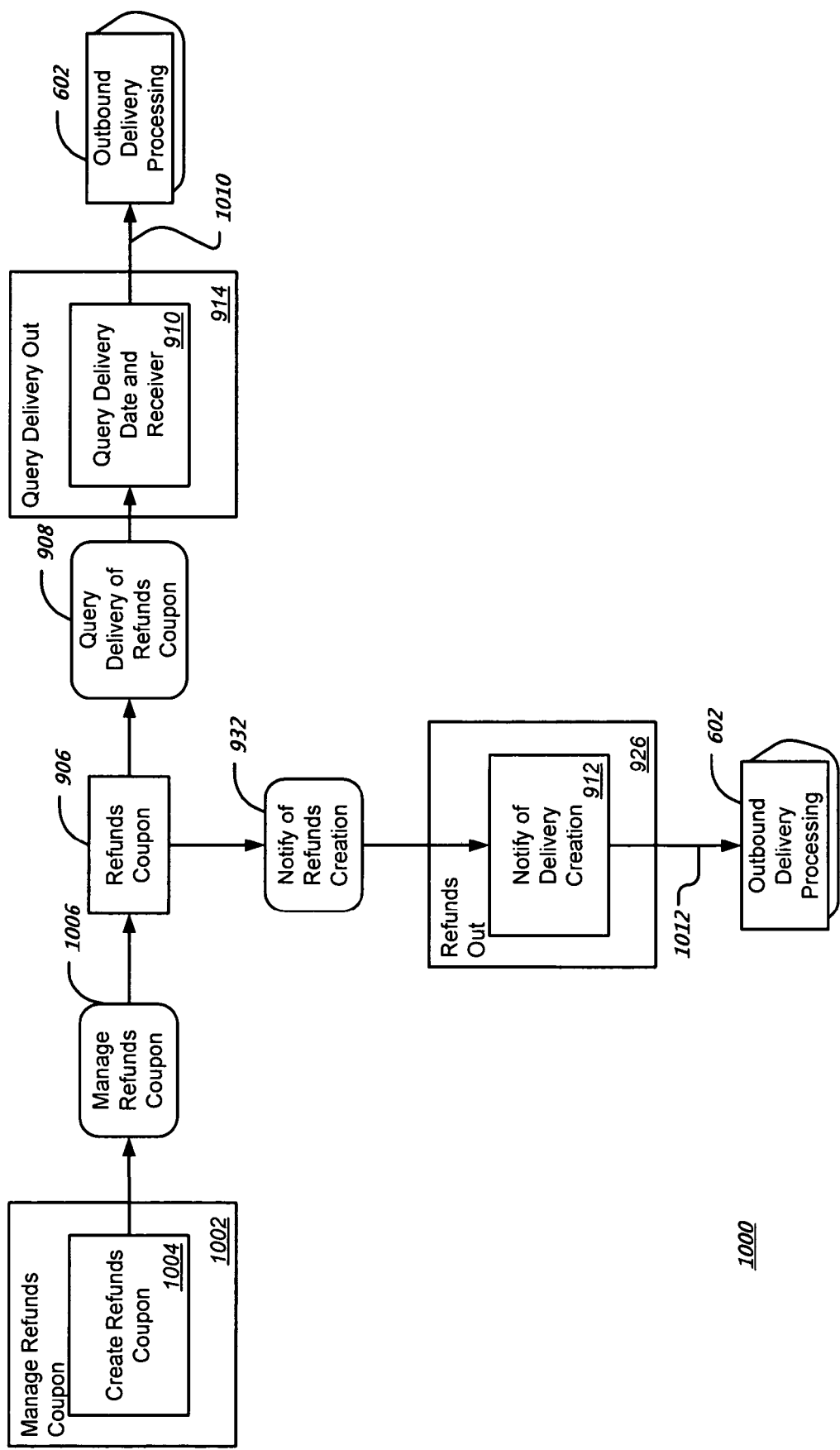
FIG. 10A is an illustration of a process component model.

FIG. 10A is an illustration of a process component model (PCM) 1000. A PCM is a view of a model that incorporates the model entities associated with a particular process component. PCM 1000 is for refund processing and is the new process component of the composite. A PCM can also describe potential interactions between a process component and other process components in the same or in different deployment units. For example, the illustrated process component 1000 can interact with the Outbound Delivery Processing process component 602. Moreover, a PCM can describe interaction with external process components that are controlled by third parties or with User-centric component. This interaction is shown on the left of the model.

When business analysts and architects have assigned process components to process steps (FIG. 6), the architects can search the PCM model in order to find out if the needed services already exist. If the needed services do not exist, they can be added. Here, a new process component has been created.

The PCM models service operations incorporated in a process component. For example, the inbound service operation 1004 called by the user-centric component, and outbound service operations 910 and 912. The arc 1010 connecting the outbound service operation 910 to the process component 602 represents that the outbound service operation 910 can invoke a service operation for the process component 602. (Similarly, arc 1012 connects outbound service operation 912 with process component 602.)

The PCM optionally models process agents (e.g., 1006, 908, 932) corresponding to the process component's service operations. For example, the inbound process agent 1006 models processing or responding to a message routed to inbound service operations 1004. The inbound process agent 1006, for example, will access and modify the business object 906 as part of the processing. The outbound process agents 908 and 932 can react to the state or a change in the state associated with the business object 906 by invoking service operations. The outbound process agent 908 can invoke the synchronous service operation 910 which will cause a message to be sent to process component 602. Likewise, the outbound process agent 932 can invoke the asynchronous service operation 912 which will also cause a message to be sent to process component 602.

If new services are consumed by the process component, these process components appear in the PCM. If new services are consumed by the user-centric component of the composite, the user-centric component does not appear. Service patterns are important in order to make sure developers use the same approach and cut (granularity) for services. Services are described below.

Figure 10B:
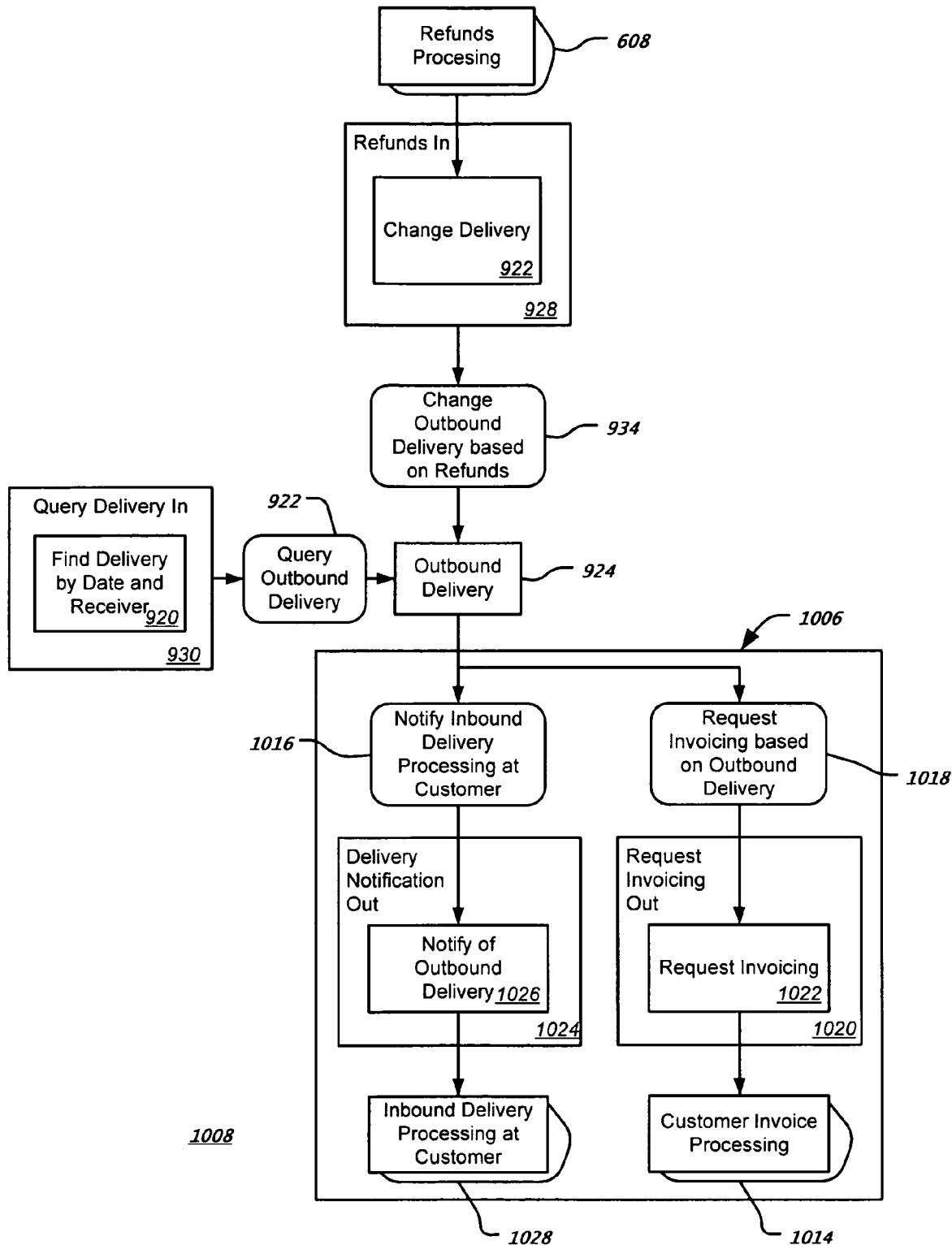
FIG. 10B is a further illustration of a process component model.

FIG. 10B is a further illustration of a PCM 1008. The PCM 1008 is for outbound delivery for the delivery of a camera to a customer. For the composite new services are needed, others have already existed before for other scenarios. The outbound delivery can interact, for example, with the new Refunds Processing process component 608 of the composite. The shaded region 1006 represents model components that already exist (i.e., that are not being modeled anew). The model 1008 includes service operations such as Change Delivery 922, Find Delivery by date and Receiver 920, Notify of Outbound Delivery 1026, and Request Invoicing 1022.

Inbound process agent 934 models processing or responding to a message routed to inbound service operation 922 and can, for example, access and modify business object 924 as part of the processing. Likewise, inbound process agent 922 models responding to a message routed to inbound service operation 920 and can access business object 924. Outbound process agent 1016 can react to the state or a change in the state associated with the business object 924 by invoking service operation 1026. Service operation 1026 will cause a message to be sent to external process component 1028. Outbound process agent 1018 can also react to the state or a change in the state associated with the business object 924 by invoking service operation 1022 which can cause a message to be sent to process component 1014.

Figure 11:
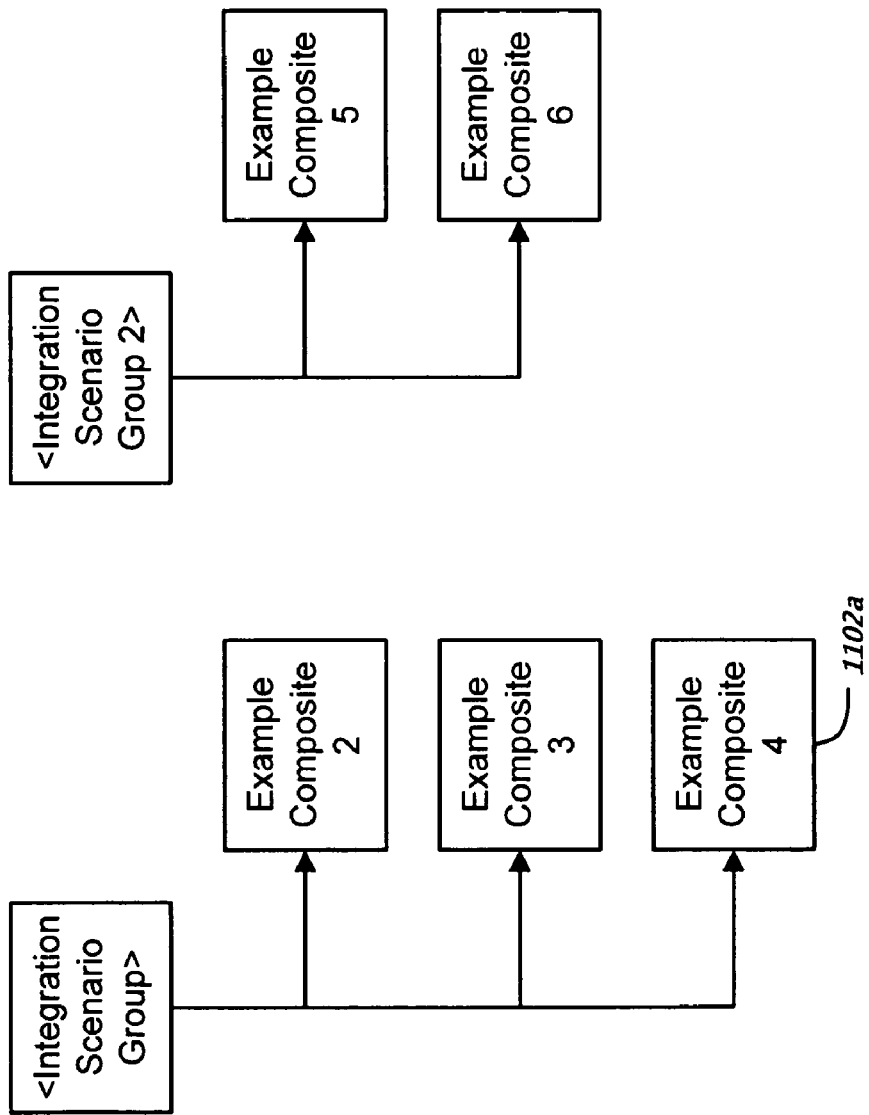
FIG. 11 is an illustration of a composite catalog.

FIG. 11 is an illustration of the composite catalog which presents available composite integration scenarios. From here users can navigate into the other models presented beforehand. Each view can present a different level of detail or emphasize a different aspect of the model. This allows for users to focus on the information that is important for carrying out their duties without being distracted by extraneous detail. In one variation, the GUI 204 allows users to "drill down" to increasing levels of model detail. For example, selection of a composite integration scenario icon 1102a in the composite integration scenario catalog 1102 can cause an associated composite integration scenario model to be presented. Likewise, selection of a graphical representation of a user-centric component in a composite integration scenario model can cause the associated process step model or detailed process step model to be presented. Selection of a graphical representation of a process component can cause an associated process component model to be presented.

In one implementation, the aforementioned graphical depictions can be presented singularly or in combination with each other in the GUI 204. Moreover, a given graphical depiction can present all of its underlying information or a portion thereof, while allowing other portions to be viewed through a navigation mechanism, e.g., user selection of a graphical element, issuance of a command, or other suitable means. Information can also be represented by colors in the display of model entities. For example, color can be used to distinguish types of business objects, types of process agents and types of interfaces.

Composite patterns and service patterns can be used to simplify the modeling of composite applications by providing reusable modeling components. A composite pattern characterizes common user interactions. TABLE 1 illustrates four such patterns.

Figure 12:
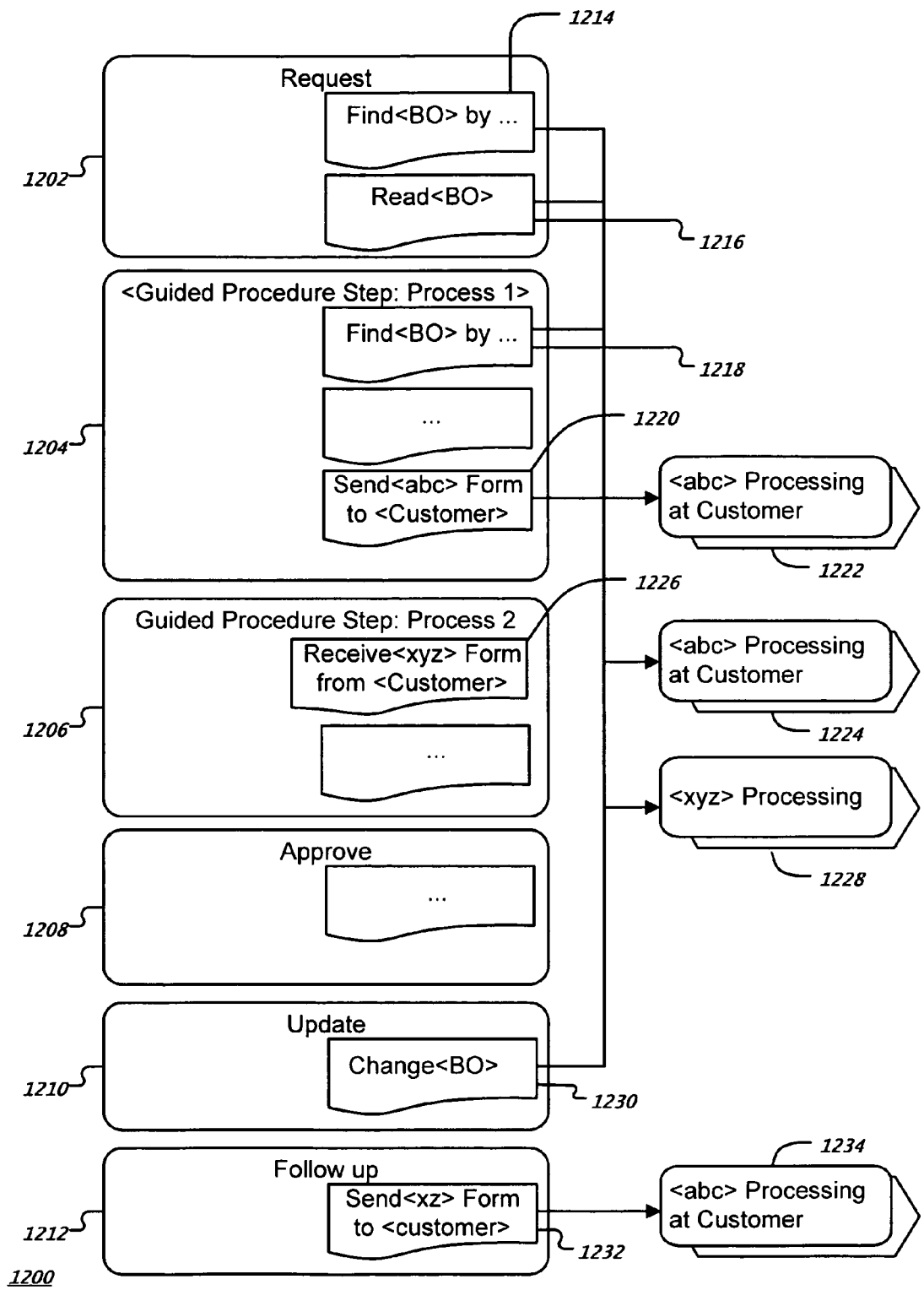
FIG. 12 is an illustration of an approval composite pattern.

FIG. 12 is an illustration of an approval composite pattern 1200. Additional approval steps may have to be added to a composite. A composite pattern is a template that includes process steps and services that are typically needed to realize such a composite, for example: An approval composite gathers data necessary to display for one or more people who have to approve a document such as a quotation. After approval the document is updated and subsequent processes can be started. For example the document might be sent to a customer.

The approval composite pattern 1200 includes a request process step 1202 for data gathering, a first guided procedure process step 1204, a second guided procedure process step 1206 for additional data processing necessary before the approval step (e.g., a form might be sent to a customer 1222 that sends additional data back 1226), an approve process step 1208, an update process step 1210 where the approved document gets a new status, and a follow up process step 1212 (e.g., sending the finalized document out to the customer).

The request process step 1202 has a service requirement 1214 for finding a business object and a service requirement 1216 for reading details of the business object. The first guided procedure setup process step 1204 has a service requirement 1218 for finding a business object by some additional criteria, and a second service requirement 1220 for sending a form to a customer. The service requirement 1220 uses a service operation defined by the process component 1222. The second guided procedure process step 1206 includes a service requirement 1226 for receiving a form from a customer.

The approve process step 1208 may include a service requirement or not (e.g., a user interface with a button 'approve' and a button 'rejected'). The update process step 1230 includes a service requirement 1230 for changing a business object (e.g., the status is changed to approved or rejected). Finally, the follow up process step 1212 has a service requirement 1232 for sending the completed form with the finalized document to a customer. The service requirement 1232 utilizes a service operation defined by process component 1234. The service requirements 1214, 1216, 1218, and 1230 use operations defined by process components 1224 or 1228.

Figure 13:
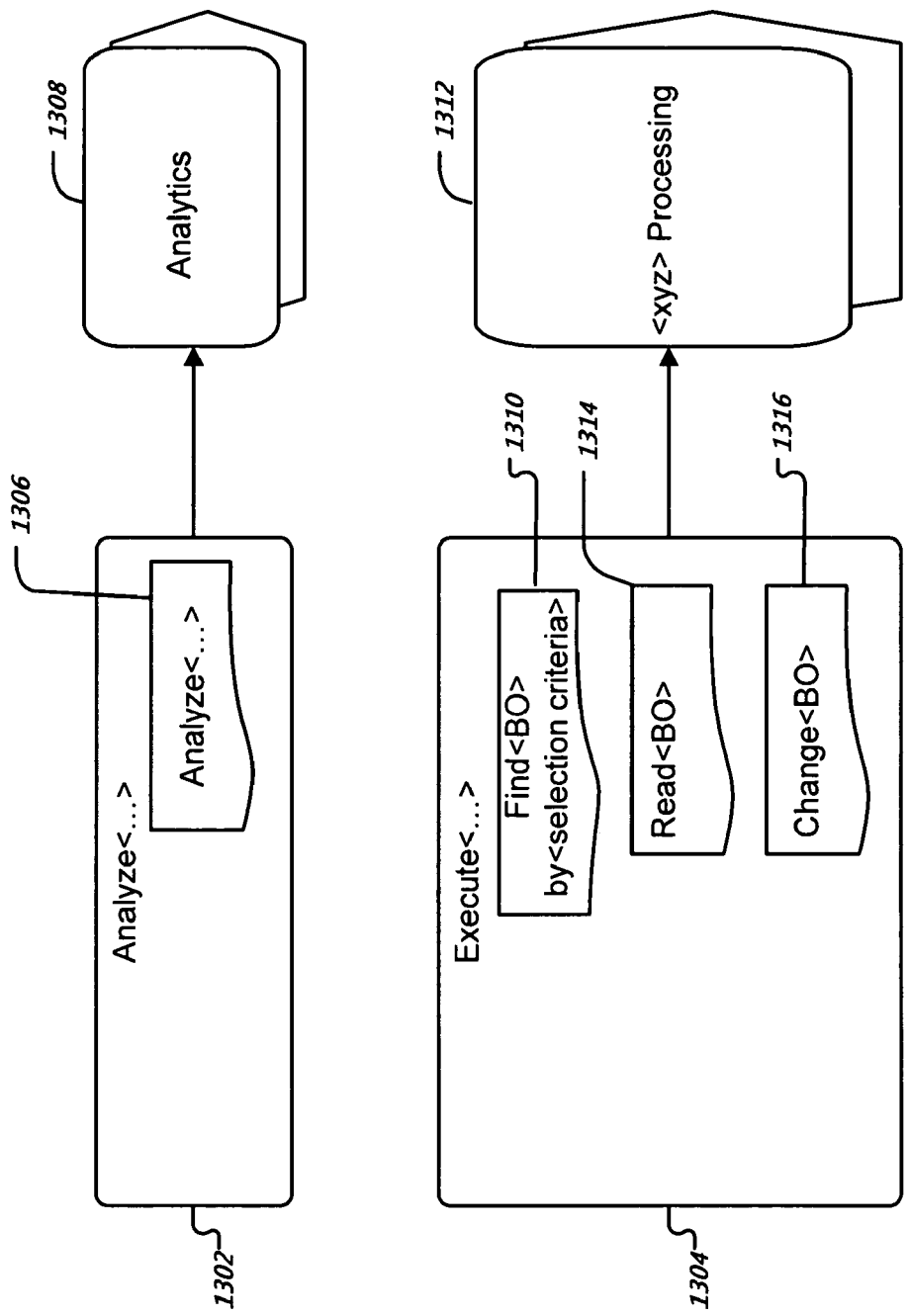
FIG. 13 is an illustration of an analyze-to-action composite pattern.

FIG. 13 is an illustration of an analyze-to-action composite pattern. for example, a sales agent might use an analytical application to analyze sales orders within different reports and drilldown possibilities. From here the agent might see that some action on a particular sales order is needed. This

TABLE 1

| COMPOSITE PATTERN | DESCRIPTION |
| --- | --- |
| Approval Composite | If a process is already established, a typical composite use case is to add approval steps. For example, information is retrieved and gathered for the approval of one or more designated users. After one user approves, the next user can approve. After approval completion the normal process foreseen within the software systems can proceed. See FIG. 12. |
| Collaboration Composite | Allows users to modify a business object to accomplish a task. For example, a quotation is created by a first user, a second user adds information to the quotation, and a third user finishes the quotation. The composite improves collaboration between the users via automating it using workflows. |
| Analyze-to-action Composite | Allows users to analyze aggregated information (reporting) and submit a request for users to perform a task based on the analysis. See FIG. 13. |
| Business Object User Interface Composite | Allows users to modify and display business objects in an easy way by furnishing a user interface layer. See FIG. 14. | action might be changing the number of items within the sales order. Changing the sales order has to be done in an operational system, instead of an analytical system.

There are two process steps: analyze 1302 and execute 1304 for doing the changes. The analyze process step 1302 includes an analyze service requirement 1306 which utilizes a service operation from an analytics process component 1308. When the user has chosen an object on which actions in the operational system have to be done, an identifier of this particular object is save within a buffer. The execute process step 1304 includes a find business object by selection criteria service requirement 1310, which provides the object's identifier to the operational system and finds the object data therein. A read business object service requirement 1314 reads details of the business object which are needed for executing the necessary changes. When the user has done the needed changes on a user interface, a change business object service requirement 1316 is needed for changing the object in the operational system. The service requirements 1314 and 1316 utilize service operations defined by process component 1312.

Figure 14:
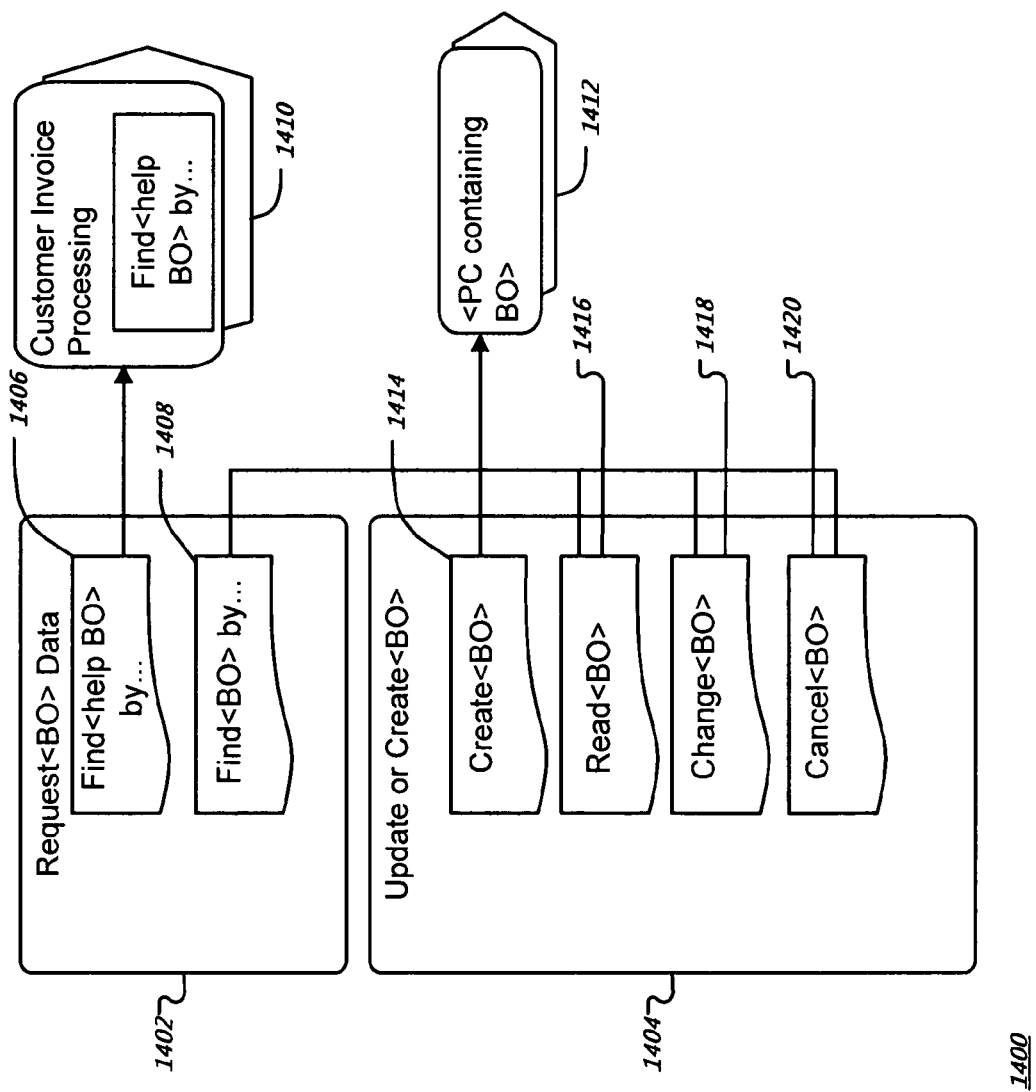
FIG. 14 is an illustration of a business object user interface composite pattern.

FIG. 14 is an illustration of a business object user interface composite pattern. Often existing user interfaces are too complicated for occasional users. Many time business objects such as a new product or a customer or a customer invoice have to be created, changed or deleted by such occasional users. This composite pattern shows what process steps and services are typically necessary.

In a first screen the user enters some data. Then the system has to find out if the business object already exists or not. For this a request business object data process step 1402 includes a find help business object service requirement 1406 and a find business object process step 1408. Service requirement 1406 utilizes a service operation defined by a customer invoice processing process component and 1408 and service requirement 1410 utilizes a service provided by another process component 1412. Now the system has found out if a business object has to be created, changed or deleted. So the update or create business object process step 1404 includes service requirements 1414 for creation, 1416 and 1418 for changing and 1420 for deleting the business object. All service requirements 1414, 1416, 1418, 1420 utilize service operations defined by the process component 1412.

In addition to composite patterns which help business analysts to model their composite in a consumer model, there are service patterns that help architects and developers to model services the process components have to provide. A service pattern is used by composite applications in order to communicate with different components and can be created in a process component model or a process component interaction model. There are two types of service patterns: services consumed by users interfaces (typically synchronous, sometimes named A2X services) and services to communicate between process components (typically asynchronous, A2A or B2B services).

A2X service patterns can be used to represent communication between a user-centric component and one or more process components, and can be modeled within process component models. For example, a user-centric component can communicate with a process component that provides the user-centric component with operations on a business object, such as for creating, finding, modifying, deleting, accessing and triggering actions on a the business object. TABLE 2 illustrates three such patterns.

TABLE 2

| SERVICE PATTERN | DESCRIPTION |
| --- | --- |
| Collaboration Managing Services | Allows users to modify a business object to Create, change, delete business Objects. Naming convention examples:<br>create <Business object><br>change <Business object><br>cancel <Business object><br>read <Business object> |
| Query Services | Find data in a system. Naming convention example:<br>Find <Business Object> by <selection criteria><br>Example: Find Sales Order by status. |
| Action Services | Allows users to modify business objects via triggering actions such as approve, reject. This pattern can incorporate the triggering of an A2A service that changes other business objects in the underlying software components |

Asynchronous service patterns can be used to represent communication of new composite process component model(s) with existing process component model(s), and can be modeled with process component interaction models. TABLE 3 illustrates three such patterns. (These service patterns may also be synchronous.)

TABLE 3

| ASYNCHRONOUS SERVICE PATTERN | DESCRIPTION |
| --- | --- |
| Request/Confirmation | The basic pattern for transactional processing. A request is provided to a process component which immediately or later confirms the execution of an associated service operation to the requester. |
| Notification | A receiving process component accepts a business event notification without a reply being expected by the sending process component. |
| Query/Response | For data provisioning. Certain data is requested from and provided by a process component in a read-only manner. |

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A composite application modeling system comprising at least one memory storing a composite application modeling tool and at least one processor executing the application modeling tool to perform operations, the operations comprising:
   processing at least one input defining a user-centric modeling component, the user-centric modeling component modeling an interactive software system and including a plurality of process steps, the plurality of process steps defining a business scenario;
   processing at least one input identifying for each process step in the plurality of process steps one or more service requirements, where a service requirement represents functionality necessary to accomplish a step;
   processing at least one input identifying for each service requirement a process component capable of providing the service requirement, the process component modeling software implementing at least one process and defining a service operation for providing the service requirement and for interacting with other process components, each process component belonging to exactly one deployment unit and comprising a pair-wise interaction with another process component in another deployment unit, each deployment unit characterizing independently operable software deployable on a separate computer hardware platform; and
   generating at least one process component interaction model with a plurality of identified process components.

2. The system of claim 1, where:
   the plurality of process steps are defined by a composite pattern.

3. The system of claim 1, where:
   the one or more service requirements are defined by a service pattern.

4. The system of claim 1, where:
   the plurality of services are defined by a service pattern.

5. The system of claim 1, the operations further comprising:
   defining a new process component to provide a service requirement.

6. The system of claim 1, the operations further comprising:
   modifying an existing process component to provide a service requirement.

7. The system of claim 1, the operations further comprising:
   defining a detailed process step model, the detailed process step model including one or more decision points.

8. The system of claim 1, the operations further comprising:
   defining a detailed process step model, the detailed process step model including one or more user interface screens, one or more user roles, and one or more departments.

9. The system of claim 1, the operations further comprising:
   defining a detailed process step model, the detailed process step model including one or tasks to be accomplished by a department or user role.

10. The system of claim 1, where:
    a process component models software implementing a distinct process.

11. The system of claim 1, where:
    the user-centric modeling component is part of a composite integration scenario; and
    the composite integration scenario comprises a plurality of logically associated process components to realize a business scenario.

12. The system of claim 1, the operations further comprising:
    defining a detailed process step model, the detailed process step model including one or more of: a decision point, an event, a workflow, an assigned department or a role.

13. A composite application modeling system comprising at least one memory storing a composite application modeling tool and at least one processor executing the application modeling tool to perform operations, the operations, comprising:
    processing at least one input defining a user-centric modeling component including a plurality of process steps, the plurality of process steps defining a business scenario;
    processing at least one input identifying for each process step in the plurality of process steps one or more service requirements for each step;
    processing at least one input identifying for each service requirement a process component capable of providing the service requirement, the process component defining a service interface for providing the service requirement and for interacting with other process components, each process component belonging to exactly one deployment unit and comprising a pair-wise interaction with another process component in another deployment unit, each deployment unit characterizing independently operable software deployable on a separate computer hardware platform;
    processing at least one input defining a detailed process step model, the detailed process step model including one or more decision points; and
    generating at least one process component interaction model with a plurality of identified process components.

14. A composite application modeling system comprising at least one memory storing a composite application modeling tool and at least one processor executing the application modeling tool to perform operations, the operations comprising
    displaying, in a first view, a composite catalog illustrating composite integration scenarios, each of the composite integration scenarios characterizing software implementing a respective and distinct business scenario;
    displaying, in a second view, a composite integration scenario illustrating a user-centric component and one or more process components, where a process component characterizes software implementing a respective and distinct process and belongs to exactly one deployment unit, each deployment unit characterizing independently operable software deployable on a separate computer hardware platform;
    displaying, in a third view, a process step model corresponding to the user-centric component, the process step model illustrating one or more process steps in a business scenario; and
    receiving a user-initiated selection of a first graphical user interface associated with a single composite integration scenario in the first view, and wherein the second view is displayed in response to the selection of the first graphical user interface element.

15. The system of claim 14, the operations further comprising:
receiving a user-initiated selection of a second graphical user interface associated with the user-centric component in the second view, and wherein the third view is displayed in response to the selection of the second graphical user interface element.

16. The computer program product of claim 15, the instructions operable to cause the data processing apparatus to perform further operations comprising:
receiving a user-initiated selection of a second graphical user interface associated with the user-centric component in the second view, and wherein the third view is displayed in response to the selection of the second graphical user interface element.

17. The system of claim 14, the operations further comprising:
displaying, in a fourth view, a process component model illustrating one or more process interfaces and a business object.

18. The system of claim 14, the operations further comprising:
receiving a user-initiated selection of a third graphical user interface associated with a process component in the second view, and wherein the fourth view is displayed in response to the selection of the third graphical user interface element.

19. A composite application modeling system including at least one memory storing a model design component and at least one processor executing the model design component, the system comprising:
a user interface, the model design component coupled to the user interface and configured to perform operations comprising:
displaying on the user interface, in a first view, a composite integration scenario catalog illustrating one or more composite integration scenarios, each of the composite integration scenarios characterizing software implementing a respective and distinct business scenario;
displaying on the user interface, in a second view, a composite integration scenario illustrating a user-centric component and one or more process components, where a process component characterizes software implementing a respective and distinct process and belongs to exactly one deployment unit, each process component comprising a pair-wise interaction with another process component in another deployment unit, each deployment unit characterizing independently operable software deployable on a separate computer hardware platform;
displaying on the user interface, in a third view, a process step model corresponding to the user-centric component, the process step model illustrating one or more process steps in a business scenario; and
generating at least one process component interaction model with a plurality of identified process components.

20. A computer program product comprising instructions encoded on a tangible computer-readable storage medium, the instructions operable when executed to cause data processing apparatus to perform operations comprising:
displaying, in a first view, a composite integration scenario catalog illustrating one or more composite integration scenarios, each of the composite integration scenarios characterizing software implementing a respective and distinct business scenario;
displaying, in a second view, a composite integration scenario illustrating a user-centric component and one or more process components, where a process component characterizes software implementing a respective and distinct process, each process component belonging to exactly one deployment unit, each deployment unit characterizing independently operable software deployable on a separate computer hardware platform; and
displaying, in a third view, a process step model corresponding to the user-centric component, the process step model illustrating one or more process steps in a business scenario; and
receiving a user-initiated selection of a first graphical user interface associated with a single composite integration scenario in the first view, and wherein the second view is displayed in response to the selection of the first graphical user interface element.

* * * * *